United States Patent
Mathew et al.

(10) Patent No.: US 9,477,749 B2
(45) Date of Patent: Oct. 25, 2016

(54) APPARATUS FOR IDENTIFYING ROOT CAUSE USING UNSTRUCTURED DATA

(71) Applicant: Clarabridge, Inc., Reston, VA (US)

(72) Inventors: Thomas Mathew, Herndon, VA (US); Kenneth Robert Voorhees, Vienna, VA (US)

(73) Assignee: CLARABRIDGE, INC., Boston, MA (US)

( * ) Notice: Subject to any disclaimer, the term of this patent is extended or adjusted under 35 U.S.C. 154(b) by 422 days.

(21) Appl. No.: 13/782,914

(22) Filed: Mar. 1, 2013

(65) Prior Publication Data

US 2013/0231920 A1 Sep. 5, 2013

Related U.S. Application Data

(60) Provisional application No. 61/606,025, filed on Mar. 2, 2012, provisional application No. 61/606,021, filed on Mar. 2, 2012.

(51) Int. Cl.
| | |
|---|---|
| *G06F 17/30* | (2006.01) |
| *G06Q 30/02* | (2012.01) |
| *G06F 17/27* | (2006.01) |

(52) U.S. Cl.
CPC ......... *G06F 17/30705* (2013.01); *G06F 17/27* (2013.01); *G06Q 30/0201* (2013.01)

(58) Field of Classification Search
CPC ............ G06F 17/30705; G06F 17/27; G06Q 30/0201
USPC ................................................. 704/1, 9, 257
See application file for complete search history.

(56) References Cited

U.S. PATENT DOCUMENTS

| | | |
|---|---|---|
| 3,576,983 A | 5/1971 | Cochran |
| 4,652,733 A | 3/1987 | Eng et al. |
| 4,871,903 A | 10/1989 | Carrell |
| 5,162,992 A | 11/1992 | Williams |
| 5,255,356 A | 10/1993 | Michelman et al. |
| 5,361,353 A | 11/1994 | Carr et al. |
| 5,396,588 A | 3/1995 | Froessl |
| 5,560,006 A | 9/1996 | Layden et al. |

(Continued)

FOREIGN PATENT DOCUMENTS

| | | |
|---|---|---|
| DE | 10337934 A1 | 4/2004 |
| EP | 1083491 A2 | 3/2001 |

(Continued)

OTHER PUBLICATIONS

"Adding Structure to the Unstructured-Computer Business Review", http://www.cbr-online.com, World Wide Web, May 25, 2005, pp. 1116.

(Continued)

*Primary Examiner* — Thierry L Pham
(74) *Attorney, Agent, or Firm* — Venable, LLP; Michele V. Frank, Esq.

(57) ABSTRACT

A system and method of identifying root cause of an observation by leveraging features from unstructured data is disclosed. A report generation component may be configured to generate a report. A report presentation component may be configured to allow an operator to select an observation from the report. A root cause component may be configured to determine one or more causal factors associated with the observation.

59 Claims, 9 Drawing Sheets

(56) References Cited

U.S. PATENT DOCUMENTS

| | | |
|---|---|---|
| 5,567,865 A | 10/1996 | Hauf |
| 5,586,252 A | 12/1996 | Barnard et al. |
| 5,608,904 A | 3/1997 | Chaudhuri et al. |
| 5,634,054 A | 5/1997 | Sarachan |
| 5,640,575 A | 6/1997 | Maruyama et al. |
| 5,664,109 A | 9/1997 | Johnson et al. |
| 5,708,825 A | 1/1998 | Sotomayor |
| 5,768,578 A | 6/1998 | Kirk et al. |
| 5,819,265 A | 10/1998 | Ravin et al. |
| 5,887,120 A | 3/1999 | Wical |
| 5,930,788 A | 7/1999 | Wical |
| 5,983,214 A | 11/1999 | Lang et al. |
| 6,003,027 A | 12/1999 | Prager |
| 6,009,462 A | 12/1999 | Birrell et al. |
| 6,052,693 A | 4/2000 | Smith et al. |
| 6,061,678 A | 5/2000 | Klein et al. |
| 6,078,924 A | 6/2000 | Ainsbury et al. |
| 6,122,647 A | 9/2000 | Horowitz et al. |
| 6,151,604 A | 11/2000 | Wlaschin et al. |
| 6,163,775 A | 12/2000 | Wlaschin et al. |
| 6,236,994 B1 | 5/2001 | Swartz et al. |
| 6,332,163 B1 | 12/2001 | Bowman-Amuah |
| 6,363,379 B1 | 3/2002 | Jacobson et al. |
| 6,366,921 B1 | 4/2002 | Hansen et al. |
| 6,449,620 B1 | 9/2002 | Draper et al. |
| 6,564,215 B1 | 5/2003 | Hsiao et al. |
| 6,584,470 B2 | 6/2003 | Veale |
| 6,629,097 B1 | 9/2003 | Keith |
| 6,643,661 B2 | 11/2003 | Polizzi et al. |
| 6,665,685 B1 | 12/2003 | Bialic |
| 6,681,370 B2 | 1/2004 | Gounares et al. |
| 6,694,007 B2 | 2/2004 | Lang et al. |
| 6,694,307 B2 | 2/2004 | Julien |
| 6,728,707 B1 | 4/2004 | Wakefield et al. |
| 6,732,097 B1 | 5/2004 | Wakefield et al. |
| 6,732,098 B1 | 5/2004 | Wakefield et al. |
| 6,735,578 B2 | 5/2004 | Shetty et al. |
| 6,738,765 B1 | 5/2004 | Wakefield et al. |
| 6,741,988 B1 | 5/2004 | Wakefield et al. |
| 6,766,319 B1 * | 7/2004 | Might |
| 6,862,585 B2 | 3/2005 | Planalp et al. |
| 6,886,010 B2 | 4/2005 | Kostoff |
| 6,912,498 B2 | 6/2005 | Stevens et al. |
| 6,970,881 B1 | 11/2005 | Mohan et al. |
| 7,043,535 B2 | 5/2006 | Chi et al. |
| 7,085,771 B2 | 8/2006 | Chung et al. |
| 7,123,974 B1 | 10/2006 | Hamilton |
| 7,191,183 B1 | 3/2007 | Goldstein |
| 7,200,606 B2 | 4/2007 | Elkan |
| 7,266,548 B2 | 9/2007 | Weare |
| 7,320,000 B2 | 1/2008 | Chitrapura et al. |
| 7,353,230 B2 | 4/2008 | Hamilton et al. |
| 7,379,537 B2 | 5/2008 | Bushey et al. |
| 7,523,085 B2 | 4/2009 | Nigam et al. |
| 7,533,038 B2 | 5/2009 | Blume et al. |
| 7,536,413 B1 | 5/2009 | Mohan et al. |
| 7,844,566 B2 | 11/2010 | Wnek |
| 7,849,048 B2 | 12/2010 | Langseth et al. |
| 7,849,049 B2 | 12/2010 | Langseth et al. |
| 8,166,032 B2 | 4/2012 | Sommer et al. |
| 8,266,077 B2 | 9/2012 | Handley |
| 8,301,720 B1 | 10/2012 | Thakker et al. |
| 8,335,787 B2 | 12/2012 | Shein et al. |
| 8,346,534 B2 | 1/2013 | Csomai et al. |
| 2001/0018686 A1 | 8/2001 | Nakano et al. |
| 2001/0025353 A1 | 9/2001 | Jakel |
| 2001/0032234 A1 | 10/2001 | Summers et al. |
| 2002/0065857 A1 | 5/2002 | Michalewicz et al. |
| 2002/0078068 A1 | 6/2002 | Krishnaprasad et al. |
| 2002/0111951 A1 | 8/2002 | Zeng |
| 2002/0128998 A1 | 9/2002 | Kil et al. |
| 2002/0129011 A1 | 9/2002 | Julien |
| 2002/0143875 A1 | 10/2002 | Ratcliff |
| 2002/0152208 A1 | 10/2002 | Bloedorn |
| 2002/0156771 A1 | 10/2002 | Frieder et al. |
| 2002/0161626 A1 | 10/2002 | Plante et al. |
| 2002/0168664 A1 | 11/2002 | Murray et al. |
| 2002/0194379 A1 | 12/2002 | Bennett et al. |
| 2003/0014406 A1 | 1/2003 | Faieta et al. |
| 2003/0016943 A1 | 1/2003 | Chung et al. |
| 2003/0033275 A1 | 2/2003 | Alpha et al. |
| 2003/0078766 A1 | 4/2003 | Appelt et al. |
| 2003/0083908 A1 | 5/2003 | Steinmann |
| 2003/0088562 A1 | 5/2003 | Dillon et al. |
| 2003/0101052 A1 | 5/2003 | Chen et al. |
| 2003/0110058 A1 | 6/2003 | Fagan et al. |
| 2003/0120133 A1 | 6/2003 | Rao et al. |
| 2003/0125988 A1 | 7/2003 | Rao et al. |
| 2003/0130894 A1 | 7/2003 | Huettner et al. |
| 2003/0144892 A1 | 7/2003 | Cowan et al. |
| 2003/0149586 A1 | 8/2003 | Chen et al. |
| 2003/0149730 A1 | 8/2003 | Kumar et al. |
| 2003/0158865 A1 | 8/2003 | Renkes et al. |
| 2003/0176976 A1 | 9/2003 | Gardner |
| 2003/0177112 A1 | 9/2003 | Gardner |
| 2003/0177143 A1 | 9/2003 | Gardner |
| 2003/0188009 A1 | 10/2003 | Agarwalla et al. |
| 2003/0204494 A1 | 10/2003 | Agrawal et al. |
| 2003/0206201 A1 | 11/2003 | Ly |
| 2003/0225749 A1 | 12/2003 | Cox et al. |
| 2004/0010491 A1 | 1/2004 | Riedinger |
| 2004/0044659 A1 | 3/2004 | Judd et al. |
| 2004/0049473 A1 | 3/2004 | Gower et al. |
| 2004/0049505 A1 | 3/2004 | Pennock |
| 2004/0103116 A1 | 5/2004 | Palanisamy et al. |
| 2004/0111302 A1 | 6/2004 | Falk et al. |
| 2004/0122826 A1 | 6/2004 | Mackie |
| 2004/0167870 A1 | 8/2004 | Wakefield et al. |
| 2004/0167883 A1 | 8/2004 | Wakefield et al. |
| 2004/0167884 A1 | 8/2004 | Wakefield et al. |
| 2004/0167885 A1 | 8/2004 | Wakefield et al. |
| 2004/0167886 A1 | 8/2004 | Wakefield et al. |
| 2004/0167887 A1 | 8/2004 | Wakefield et al. |
| 2004/0167888 A1 | 8/2004 | Kayahara et al. |
| 2004/0167907 A1 | 8/2004 | Wakefield et al. |
| 2004/0167908 A1 | 8/2004 | Wakefield et al. |
| 2004/0167909 A1 | 8/2004 | Wakefield et al. |
| 2004/0167910 A1 | 8/2004 | Wakefield et al. |
| 2004/0167911 A1 | 8/2004 | Wakefield et al. |
| 2004/0172297 A1 | 9/2004 | Rao et al. |
| 2004/0186826 A1 * | 9/2004 | Choi et al. ............... 707/3 |
| 2004/0194009 A1 | 9/2004 | LaComb et al. |
| 2004/0215634 A1 | 10/2004 | Wakefield et al. |
| 2004/0225653 A1 | 11/2004 | Nelken et al. |
| 2004/0243554 A1 | 12/2004 | Broder et al. |
| 2004/0243560 A1 | 12/2004 | Broder et al. |
| 2004/0243645 A1 | 12/2004 | Broder et al. |
| 2005/0004909 A1 | 1/2005 | Stevenson et al. |
| 2005/0010454 A1 | 1/2005 | Falk et al. |
| 2005/0015381 A1 | 1/2005 | Clifford et al. |
| 2005/0038805 A1 | 2/2005 | Maren et al. |
| 2005/0049497 A1 | 3/2005 | Krishnan et al. |
| 2005/0050037 A1 | 3/2005 | Frieder et al. |
| 2005/0055355 A1 | 3/2005 | Murthy et al. |
| 2005/0059876 A1 | 3/2005 | Krishnan et al. |
| 2005/0065807 A1 | 3/2005 | DeAngelis et al. |
| 2005/0065941 A1 | 3/2005 | DeAngelis et al. |
| 2005/0065967 A1 | 3/2005 | Schuetze et al. |
| 2005/0086215 A1 | 4/2005 | Perisic |
| 2005/0086222 A1 | 4/2005 | Wang et al. |
| 2005/0091285 A1 | 4/2005 | Krishnan et al. |
| 2005/0108256 A1 | 5/2005 | Wakefield et al. |
| 2005/0108267 A1 | 5/2005 | Gibson et al. |
| 2005/0165712 A1 | 7/2005 | Araki et al. |
| 2005/0240984 A1 | 10/2005 | Farr et al. |
| 2005/0243604 A1 | 11/2005 | Harken et al. |
| 2006/0253495 A1 | 11/2006 | Png |
| 2007/0011134 A1 | 1/2007 | Langseth et al. |
| 2007/0011175 A1 | 1/2007 | Langseth et al. |
| 2008/0086363 A1 * | 4/2008 | Kass ............... G06Q 10/04 705/7.29 |
| 2008/0249764 A1 | 10/2008 | Huang et al. |
| 2009/0037457 A1 | 2/2009 | Musgrove |
| 2009/0292583 A1 | 11/2009 | Eilam et al. |

(56) References Cited

U.S. PATENT DOCUMENTS

| | | |
|---|---|---|
| 2009/0307213 A1 | 12/2009 | Deng et al. |
| 2009/0319342 A1 | 12/2009 | Shilman et al. |
| 2010/0049590 A1 | 2/2010 | Anshul |
| 2010/0153318 A1 | 6/2010 | Branavan et al. |
| 2010/0241620 A1 | 9/2010 | Manister et al. |
| 2010/0332287 A1 | 12/2010 | Gates et al. |
| 2011/0106807 A1 | 5/2011 | Srihari et al. |
| 2011/0137707 A1 | 6/2011 | Winfield et al. |
| 2011/0161333 A1 | 6/2011 | Langseth et al. |
| 2011/0231394 A1 | 9/2011 | Wang et al. |
| 2011/0276513 A1 | 11/2011 | Erhart et al. |
| 2011/0282858 A1 | 11/2011 | Karidi et al. |
| 2011/0302006 A1 | 12/2011 | Avner et al. |
| 2011/0307312 A1* | 12/2011 | Goeldi ................... 705/14.6 |
| 2012/0259617 A1 | 10/2012 | Indukuri et al. |
| 2012/0290622 A1 | 11/2012 | Kumar et al. |
| 2013/0036126 A1* | 2/2013 | Anderson ................ 707/754 |

FOREIGN PATENT DOCUMENTS

| | | |
|---|---|---|
| JP | 1021249 A | 1/1989 |
| JP | 2004258912 A | 9/2004 |
| WO | WO-96/30845 A1 | 10/1996 |
| WO | WO-98/35469 A2 | 8/1998 |
| WO | WO-00/26795 A1 | 5/2000 |
| WO | WO-02/082318 A2 | 10/2002 |
| WO | WO-02/095616 A1 | 11/2002 |
| WO | WO-03/004892 A1 | 1/2003 |
| WO | WO-03/040878 A2 | 5/2003 |
| WO | WO-03/098466 A1 | 11/2003 |
| WO | WO-2004/104865 A2 | 12/2004 |
| WO | WO-2007/005730 A2 | 1/2007 |
| WO | WO-2007/005732 A2 | 1/2007 |
| WO | WO-2007/021386 A2 | 2/2007 |

OTHER PUBLICATIONS

"EIQ Server", http://www.whamtech.com/eiq_server.htm>, World Wide Web, May 25, 2005, pp. 1-3.

"GEDDM—Grid Enabled Distributed Data Mining", http://www.qub.ac.uk/escience/projects/geddm/geddm handout.pdf, World Wide Web, pp. 1-2.

"Innovative Applications;", http://www2002.oreispector.pdg, World Wide Web, pp. 1-5.

Agrawal et al., "Athena: Mining-Based Interactive Management of Text Databases," 2000, EDBT, LNCS 1777, 365-379.

Alani et al., "Automatic Ontology-Based Knowledge Extraction from Web Documents," IEEE Computer Society, 2003.

Bourret, "Persistence: SGML and XML in Databases", http://www.isemlug.org/database.html, World Wide Web, 2002, pp. 1-5.

Buttler et al., "Rapid Exploitation and Analysis of Documents," Lawrence Livermore National Laboratory, Dec. 2011, pp. 1-40.

Clark, "XSL Transformations (XSLT) Version 1.0," W3C, 1999.

Crosman, "Content Pipeline", http://messagingpipeline.com/shared/article/printableArticleSrc.jhtml?articleId=51201811>, World Wide Web, Nov. 1, 2004, pp. 1-8.

Darrow, "IBM Looks to 'Viper'Database to Combat Oracle, Microsoft", http://www.bizintellignecepipeline.com/shared/article/printable.ArticleSrc.Jhtml, World Wide Web, May 25, 2005, pp. 1-5.

Das et al., "Opinion Summarization in Bengali: A Theme Network Model," Retrieved From: http://ieeexplore.ieee.org/xpl/login.jsp?tp=&arnumber=5591520&url=http%3A%2F%2Fieeexplore.ieee.org%2Fxpls%2Fabs_all.jsp%3Farnumber%3D5591520, Aug. 20-22, 2010, pp. 675-682.

Das et al., "Theme Detection an Exploration of Opinion Subjectivity," IEEE, 2009, pp. 1-8.

Embley et al., "Ontology-Based Extraction and Structuring of Information form Data-Rich Unstructured Documents," In Proceedings of the Conference on Information and Knowledge Management (CIKM'98), 1998.

Extended European Search Report issued in Application No. 06774414.4 dated Dec. 27, 2010.

Extended European Search Report issued in Application No. 06774415.4 dated Dec. 27, 2010.

Ferrucci, "Building an Example Application With the Unstructured Information Management Architecture", http://www.findarticles.com/p/articles/mi mISJ/is 3 43/ain7576557/print, World Wide Web, Mar. 16, 2004, pp. 1-22.

Gamon et al., "Pulse: Mining Customer Opinions from Free Text," Springer-Verlag Berline Heidelberg, 2005.

Ghanem et. al., "Dynamic Information Integration for E-Science", http://www.discovery-on-the.net/documents/DynamicInformationintegration.pdf>, World Wide Web, pp. 1-2.

Gold-Bernstein, "EbizQ Integration Conference", http://www.ebizq.net/topics/portals/features/4371.html?page=2&pp=1>, World Wide Web, May 10, 2005, pp. 1-5.

Harabagiu et al., "Using Topic Themse for Multi-Document Summarization," ACM Transactions on Information Systems, vol. 28, No. 3, Jun. 2010, pp. 1-47.

Hearst, Marti A., "Untangling Text Data Mining," Proceeding of the 37th annual meeting of the Association for Computational Linguistics on Computational Linguistics, 1999.

Hu et al., "Mining Opinion Features in Customer Reviews," American Association for Articial Intelligence, 2004 pp. 1-6.

Infoconomy Staff, "Enterprise Search Tools", http://www.infoconomy.com/pages/infoconomist-crib-sheets/group101866.adp, World Wide Web, Dec. 1, 2004, pp. 1-5.

International Preliminary Report on Patentability issued in Application No. PCT/US2006/025810 dated Jan. 10, 2008.

International Preliminary Report on Patentability issued in Application No. PCT/US2006/025811 dated Jan. 9, 2008.

International Search Report issued in Application No. PCT/US2006/025810 dated Jul. 27, 2007.

International Search Report issued in Application No. PCT/US2006/025811 dated Feb. 16, 2007.

International Search Report issued in Application No. PCT/US2006/025814 dated Jan. 3, 2007.

Kelly et al., "Roadmap to checking data migration," 2003, *Elsevier*, 506-510.

Keogh et al., On the Need for Time Series Data Mining Benchmarks: A survey and Empirical Demonstration, 2003, Data Mining and Knowledge Discovery, 7:349-371.

Kim et al., "Automatic Identification of Pro and Con Reasons in Online Reviews," ACL 2006, pp. 1-8.

Kim et al., "Determining the Sentiment of Opinions," ACM, 2004.

Kugel, "Transform Magazine: Unstructured Information Management", http://www.transformmag.com/shard/cp/print articlejthm hsessionid. >, World Wide Web, Dec. 2003, pp. 1-3.

Lau et al., "Automatic Labelling of Topic Models," Proceedings of the 49th Annual Meeting of the Association for Computational Linguistics, Jun. 19-24, 2011, pp. 1536-1545.

Ma et al., "Extracting Unstructured Data from Template Generated Web Documents," 2003, *CIKM*, 512-515.

Moschitti et al., "Open Domain Information Extraction via Automatic Semantic Labeling," American Association for Artificial Intelligence, 2003.

Nagao et al., "Automatic Text Summarization Based on the Global Document Annotation," International Conference on Computational Linguistics Proceedings, 1998, vol. 2, pp. 917-921.

Notice of Allowance issued in U.S. Appl. No. 11/172,955, dated Aug. 16, 2010, 20 pages.

Notice of Allowance issued in U.S. Appl. No. 11/172,956, dated Aug. 18, 2010, 19 pages.

Office Action issued in U.S. Appl. No. 11/172,955, dated Apr. 29, 2009, 38 pages.

Office Action issued in U.S. Appl. No. 11/172,955, dated Jan. 5, 2010, 37 pages.

Office Action issued in U.S. Appl. No. 11/172,955, dated Jul. 25, 2007, 39 pages.

Office Action issued in U.S. Appl. No. 11/172,955, dated May 30, 2008, 43 pages.

Office Action issued in U.S. Appl. No. 11/172,956, dated Apr. 28, 2009, 28 pages.

(56) References Cited

OTHER PUBLICATIONS

Office Action issued in U.S. Appl. No. 11/172,956, dated Aug. 8, 2007; 26 pages.
Office Action issued in U.S. Appl. No. 11/172,956, dated Jan. 7, 2010, 34 pages.
Office Action issued in U.S. Appl. No. 11/172,956, dated May 30, 2008, 27 pages.
Office Action issued in U.S. Appl. No. 11/172,957, dated Aug. 8, 2007, 35 pages.
Office Action issued in U.S. Appl. No. 12/959,805, dated Mar. 31, 2011, 26 pages.
Examiner Interview Summary issued in U.S. Appl. No. 11/172,955, dated Feb. 1, 2008, 2 pages.
Examiner Interview Summary issued in U.S. Appl. No. 11/172,955, dated Oct. 22, 2009, 4 pages.
Examiner Interview Summary issued in U.S. Appl. No. 11/172,956, dated Jan. 28, 2008, 3 pages.
Pang et al., "Thumbs Up? Sentiment Classification using Machine Learning Techniques," Proceedings of the Conference of Empirical Methods in Natural Language Processing (EMNLP), 2002, pp. 79-86.
Park et al., "Co-trained support vector machines for large scale unstructured document classification using unlabeled data and syntactic information," Information Processing and Management, 2004.
Patro et al., "Seamless Integration of Diverse Types into Exploratory Visualization Systems," Eurographics, 2003.
Pradhan et al., "Semantic Role Parsing: Adding Semantic Structure to Unstructured Text," Proceedings of the Third IEEE International Conference on Data Mining (ICDM.03), 2003.
Russom, Philip, "How to Evaluate Enterprise ETL," Tech Choices, 2004.
Spector, "Architecting Knowledge Middleware;" http://itlab.uta.edu/idm01/FinalReports/Innovation.pdf, World Wide Web, 2002, pp. 1-40.
Swoyer, "IBM's BI Middleware Play: Its All About Integration, Partnerships", http://www.tdwi.org/Publications/display.aspx?id+7267&t=y, World Wide Web, Nov. 3, 2004, pp. 1-3.
The Unstructured Information Management Architecture Project, http://www.research.ibm.com/UIMA/>, World Wide Web, May 25, 2005, pp. 1-2.
Tkach, Daniel S., "Information Mining with the IBM Intelligent Miner Family," IBM, 1998.
Vesset et al., "White Paper: Why Consider Oracle for Business Intelligence?" IDC, 2004.
Wang et. al., "Database Research at Watson", http://www.researchibm.com/scalabledb/semistruct.html, World Wide Web, May 25, 2005, pp. 1-3.
Written Opinion of the International Searching Authority issued in Application No. PCT/US2006/025810 dated Jul. 27, 2007.
Written Opinion of the International Searching Authority issued in Application No. PCT/US2006/025811 dated Feb. 16, 2007.
Yang et al., "Automatic Category Theme Identification and Hierarchy Generation for Chinese Text Categorization," Kluwer Academic Publishers, 2000, pp. 1-26.
Zheng, "Tradeoffs in Certificate Revocation Schemes," Apr. 2003, ACM SIGCOMM Computer Communications Review, 33:2:103-112.
Zornes, "EA Community Articles", http://www.eacommunity.com/articles/openarticle.asp?ID=1834>, World Wide Web, May 25, 2005, pp. Jan. 3, 2013.

\* cited by examiner

Software Architecure

APPARATUS FOR IDENTIFYING ROOT CAUSE USING UNSTRUCTURED DATA

CROSS-REFERENCE TO RELATED APPLICATIONS

This application claims the benefit of U.S. Provisional Patent Application No. 61/606,025, filed Mar. 2, 2012, and also claims the benefit of U.S. Provisional Patent Application No. 61/606,021, filed Mar. 2, 2012, the contents of each of which are hereby incorporated by reference herein in their entirety.

FIELD OF THE INVENTION

Various embodiments are directed generally to data analysis and specifically to methods and systems that allow structured data tools to operate on unstructured data.

BACKGROUND OF INVENTION

Studies correlate higher overall customer satisfaction levels with improved profitability for business organizations. This correlation may be explained by 1) a satisfied customer is more likely to solicit future business from an organization; and 2) a satisfied customer is more likely to recommend an organization's offerings to their acquaintances, which provides opportunities for acquiring new business.

Today, a large number of business organizations constantly survey a sample of their customers in order to quantitatively project an overall customer satisfaction level. This metric can be thought of as a "customer pulse" By being sensitive to variations and trending patterns in the value of such a metric over time, on organization can react quickly to address areas of customer pain or to faster adjust to shifting customer expectations.

In order for an organization to apply appropriate remediative adjustments, it is critical to be able to associate and explain a specific variation (e.g. an unexpected drop in overall customer satisfaction) against tangible causal factors.

An important resource for evaluating meaningful cause behind shifting overall customer satisfaction is direct customer feedback (e.g. solicited customer surveys and direct customer complaints) and indirect customer feedback (e.g. feedback garnered from social media channels). Such feedback is typically collected as unstructured text.

Conventional approaches to evaluating causal cues from unstructured text require human resources to physically read all feedback associated with the variation, and to then make inferences on which specific issues may have caused the variation. Such an approach is time-consuming, and any delay in identifying issues may translate to loss of potential revenue. Conventional approaches are also labor intensive, inconsistent, error-prone, and tend to be influenced by subjective judgment.

Various embodiments include systems and methods for automating causal analysis.

SUMMARY

Various embodiments are directed generally to data analysis and specifically to methods and systems that allow structured data tools to operate on unstructured data.

In some embodiments, a system may comprise a report generation component configured to generate a report; a report presentation component configured to allow an operator to select an observation from the report; a root cause component configured to determine one or more causal factors associated with the observation; a memory configured to store the report generation component, the report presentation component, and the root cause component; and at least one processor to implement the report generation component, the report presentation component, and the root cause component.

In some embodiments, a method of determining one or more causal factors for an observation may comprise: receiving an instruction to execute a report from a user; receiving an instruction to determine the one or more causal factors associated with an observation selected by the user; determining, by a processor, the one or more causal factors associated with the selected observation; ranking, by the processor, the one or more causal factors based on a measure of statistical association to the selected observation; and presenting results to the user In some embodiments, a computer readable storage medium may comprise instructions that if executed enables a computing system to: receive an instruction to execute a report from a user; receive an instruction to determine the one or more causal factors associated with an observation selected by the user; determine the one or more causal factors associated with the selected observation; rank the one or more causal factors based on a measure of statistical association to the selected observation; and present results to the user.

Additional features, advantages, and embodiments are set forth or apparent from consideration of the following detailed description, drawings and claims. Moreover, it is to be understood that both the foregoing summary and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention.

DETAILED DESCRIPTION OF THE EMBODIMENTS

Various embodiments are directed systems and methods for performing root cause analysis using unstructured data. Such a capability is not possible with existing unstructured and structured data analysis tools.

In some embodiments, an apparatus may be provided to process unstructured text to determine, evaluate and rank causal factors associated with the magnitude and/or timing of a measured observation.

Observations that can be measured and analyzed may include, but are not limited to, average customer sentiment, measure of customer satisfaction, volume of customer comments.

Observations may either be measured over an entire set of customer feedback (i.e. overall measures) or may be restricted to cover only a specific topic of discussion, only a specific segmented set of customers (e.g. Men in age group 30-45), or constrained by a defined criteria (e.g. comments received during Black Friday).

Unstructured text may refer to human language in written form. Unstructured text may be acquired from a variety of sources such as surveys, e-mails, call center notes, audio conversation transcripts, chat data, word processing documents such as excel or word documents, social media such as Facebook or twitter, review websites or news content.

Trended data may refer to data that is being analyzed over time e.g. weekly trend report, daily trend report etc.

Untrended data may refer to data that is being analyzed without consideration of a time component.

A satisfaction measure may refer to an aggregated computed measure of overall customer satisfaction.

An observed anomaly may refer to an observation in a data report which stands out when compared to its peers because of a variation in some quantitative measure such as, but not limited to, volume, sentiment or satisfaction score.

The causal factors that are presented as the output by this present invention may include 1) discussion topics, 2) lexical patterns, 3) semantic patterns, 4) customer groups, and any combination thereof.

Figure 1:
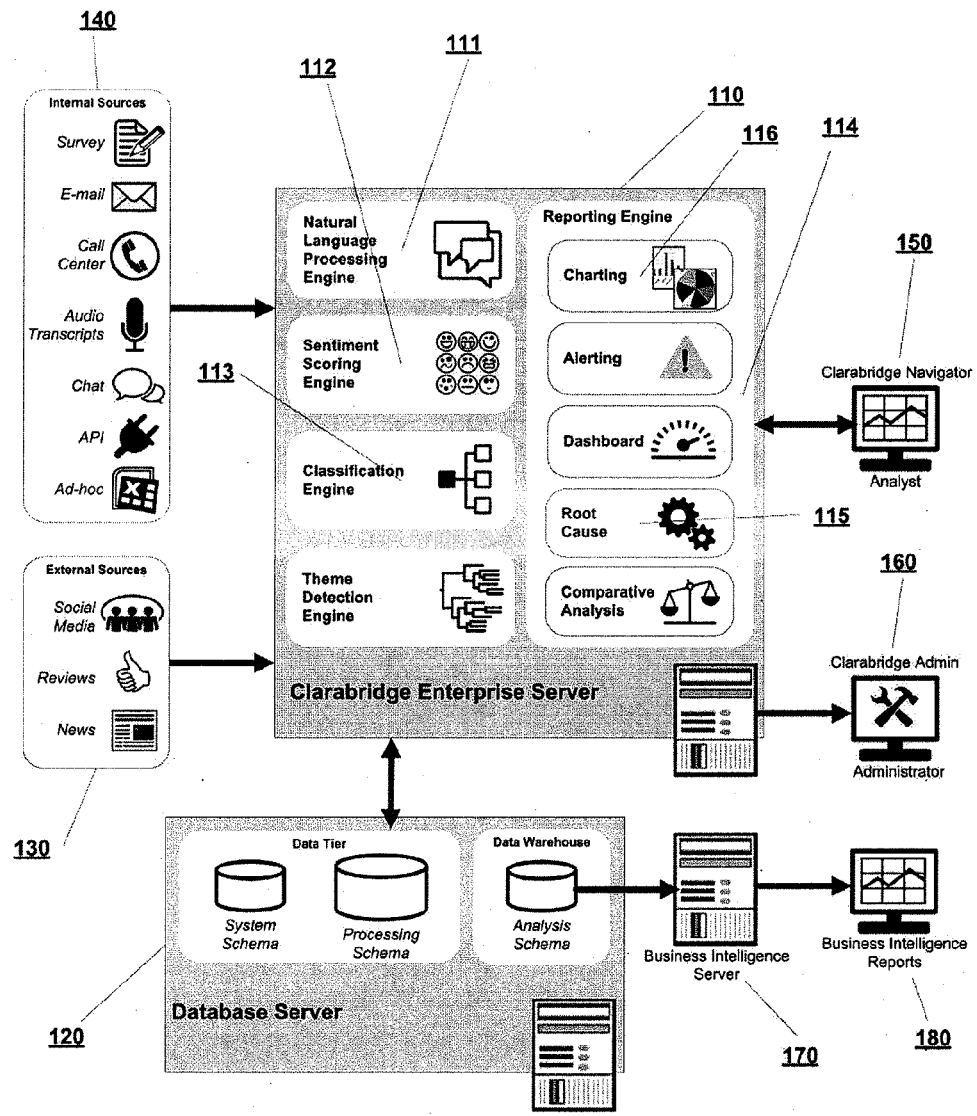
FIG. 1 depicts an exemplary system 100 in accordance with one or more embodiments.

FIG. 1 depicts an exemplary system 100 in accordance with one or more embodiments.

System 100 may include enterprise server 110, database server 120, one or more external sources 130, one or more internal sources 140, navigator device 150, administrator device 160, business intelligence server 170, and business intelligence report device 180.

Enterprise server 110, database server 120, one or more external sources 130, one or more internal sources 140, navigator device 150, administrator device 160, business intelligence server 170, and business intelligence report device 180 may be connected through one or more networks. The one or more networks may provide network access, data transport and other services to the devices coupled to it. In general, one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may, again as an alternative or in conjunction with one or more of the above, implement a WiMAX architecture defined by the WiMAX forum. The one or more networks may also comprise, for instance, a local area network (LAN), a wide area network (WAN), the Internet, a virtual LAN (VLAN), an enterprise LAN, a virtual private network (VPN), an enterprise IP network, or any combination thereof.

Enterprise server 110, database server 120, and business intelligence server 170 may be any type of computing device, including but not limited to a personal computer, a server computer, a series of server computers, a mini computer, and a mainframe computer, or combinations thereof. Enterprise server 110, database server 120, and business intelligence server 170 may each be a web server (or a series of servers) running a network operating system, examples of which may include but are not limited to Microsoft Windows Server, Novell NetWare, or Linux.

Enterprise server 110 may include natural processing engine 111, sentiment scoring engine 112, classification engine, 113 and reporting engine, 114.

Natural language processing engine 111 may include subsystems to process unstructured text, including, but not limited to, language detection, sentence parsing, clause detection, tokenization, stemming, part of speech tagging, chunking, and named entity recognition. In some embodiments, natural language processing engine 111 may perform any or all portions of the exemplary process depicted in FIG. 3, which is further discussed below.

Sentiment scoring engine 112 may identify a value representing the general feeling, attitude or opinion that an author of a section of unstructured text is expressing towards a situation or event. In some embodiments, the sentiment scoring engine may classify sentiment as either positive, negative or neutral. In some embodiments, the sentiment scoring engine may assign a numeric sentiment score on a numeric scale ranging from a minimum value representing the lowest possible sentiment to a maximum value representing the highest possible sentiment. In some embodiments, a dictionary of words is included, in which selected words are pre-assigned a sentiment tuning value. In some embodiments, the presence or absence of language features such as negation (e.g. NOT GOOD) or modifiers (e.g. VERY GOOD, SOMEWHAT GOOD, etc.) when modifying certain words (e.g. GOOD) influence the computation of sentiment for that sentence or clause.

In some embodiments, if a sentence has a single sentiment word with no negators or modifiers, the sentence sentiment score may be equal to the sentiment of that word (For example, a single word with a sentiment value of +3 will result in a sentence sentiment score of +3). In some embodiments, for sentences with multiple sentiment words, the following calculation may be applied. Consider the sentence below as an example:

The room was $\underset{+3}{\text{exceptionally clean}}$, $\underset{+3}{\text{very spacious}}$, $\underset{+2}{\text{nicely decorated}}$ and $\underset{+1}{\text{inexpensive}}$ 1. Find the highest sentiment word value in the sentence. This will be used as a base for the sentence sentiment. In the example sentence this is +3.
2. Add +0.5 for every additional word with the same sentiment. In the example, there is one more word with +3 so add +3 and +0.5 which equals to +3.5
3. Add +0.25 for every word one level lower in sentiment. In the example, there is just one token with +2, so (3.5+0.25)=+3.75
4. The same approach is applicable for each subsequent levels. For sentiment level n−1 take the value of individual token on the level n and divide by 2 and then multiply by number of tokens with sentiment (n−1). So, in the example to calculate the effect of +1 token you have add +0.25/2 to the sentence sentiment: (3.75+0.25/2)=3.875. The only exception is that word sentiment level 0.25 (multiple decreasing modifiers attached to the word with a +1 or −1 value) is handled the same way as 0.5—the net effect for the sentence sentiment will be the same for both levels as there is no meaningful difference between the two cases.
5. Total sentence sentiment=+3.875
The same calculation model may be used for a sentence with negative words: adding a negative value equals subtraction of this value. When a sentence contains both positive and negative words, the calculations are done separately for positive and negative parts and then summed up.

Classification engine 113 may identify whether a particular classification category applies to a portion of unstructured text. In some embodiments each classification category is represented by one or many rules. In some embodiments, the rules may be expressed in Boolean logic. In some embodiments, the rules may be represented by a trained machine learning model.

Reporting engine 114 may report against categories and sentiment expressed in a collection of documents. In some embodiments, the categories used in reporting may include theme detected topics. Reporting engine may include a charting module 116, alerting module, dashboard module, root cause module 115, comparative analysis module, and any combination thereof.

In some embodiments, theme detection may be performed with or by any one or more of the embodiments disclosed in co-pending U.S. patent application Ser. No. 13/783,063 filed Mar. 1, 2013, entitled "Apparatus for Automatic Theme Detection from Unstructured Data,", which is hereby incorporated herein by reference.

The root cause module 115 may perform any or all of the exemplary processes depicted by FIGS. 2, 3, 4, 5, 6, 7 which are further discussed below.

In some embodiments, a user or a business may use an analysis tool provided by navigator device 150 to visualize data from charting 116 or dashboard and may allow a user of the analysis tool to select specific observations within a specific analysis. The user may instruct a module of the system, such as root cause module 115, to determine root cause factors that can explain the selected observation.

Figure 2:
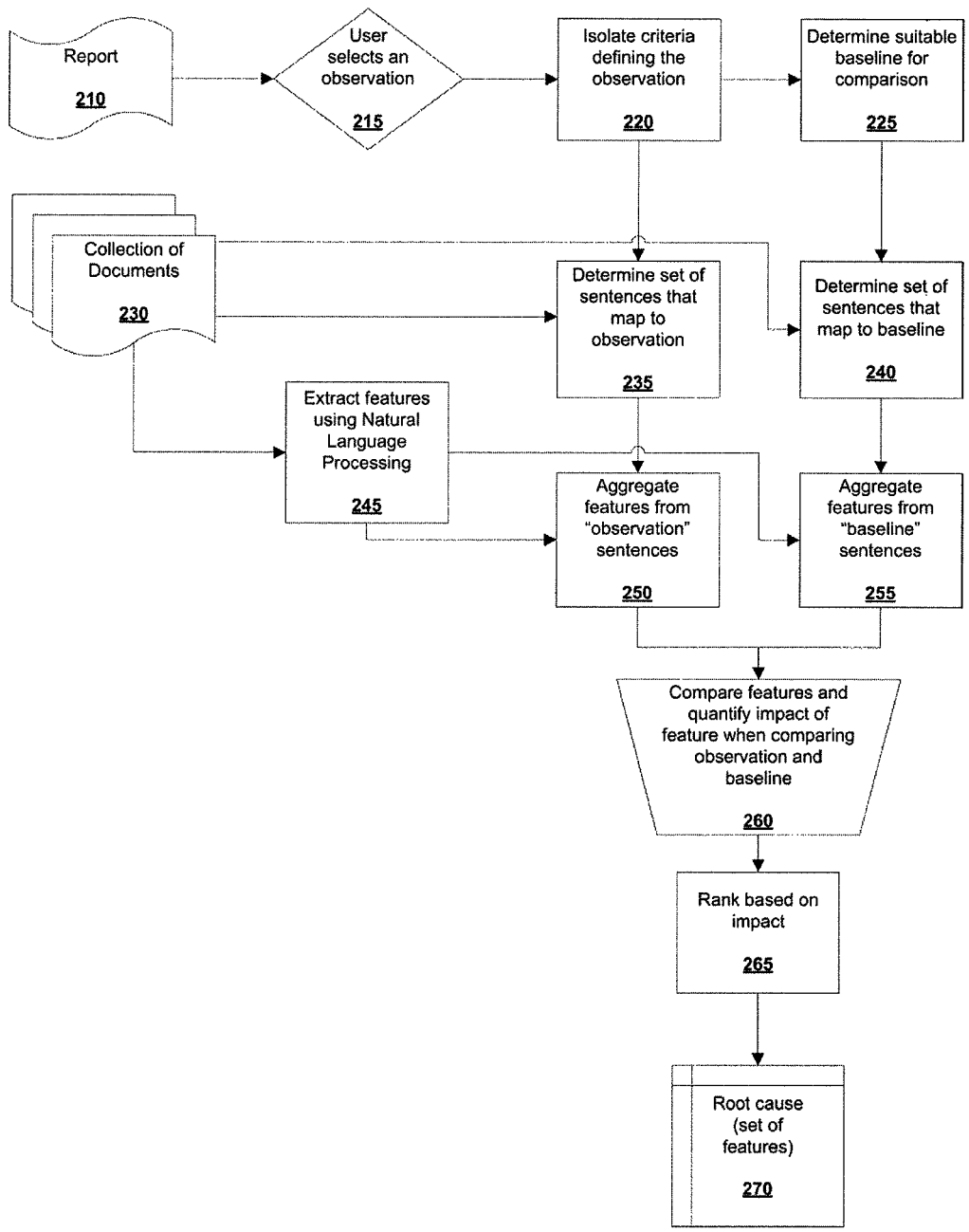
FIG. 2 depicts an exemplary data flow diagram 200 in accordance with one or more embodiments.

FIG. 2 depicts an exemplary data flow diagram 200 in accordance with one or more embodiments. Data flow diagram 200 depicts an approach for isolating and quantifying factors present for a user selected observation 215 from a report or analysis 210. For example, when viewing a monthly trend report, a user may observe a drop in sentiment for Store XYZ for the month of February 2012; the user may then select the observation and instruct the apparatus to determine causal factors 270 that explain the observed drop in sentiment.

In block 220 criteria for isolating the selected observation 215 are identified. Criteria may include any filters applied in the analysis or any report elements that define the selected observation 215. For example, for a monthly trend report where a user observes that sentiment for Store XYZ has dropped on February 2012, criteria to isolate the selected observation may include MONTH=[FEB 2012] AND STORE=[XYZ].

An observation may be chosen by the system or by using a reporting or analytic tool where a user can select a data point on a graphic or tabular report. The observation may be defined by filters applied to restrict data covered by the report, categorical values associated with the selected data point, a time or time period associated with the selected data point, any numerical value associated with the data point, and a definition of a metric used for the numerical value. A metric may be of two types: purely volume based (numerical) or a customer behavior measure, e.g. measures of customer satisfaction, average sentiment, and average feedback rating. A report may be of two types: a trended report, in which time is one dimension being reported, or a non-trend report, in which the report does not have a time component. For trended reports, an observation is considered to be either a spike or dip on the metric being measured when compared to the previous time period. For a non-trend report, the criteria for an observation set may correspond to data elements that have a similar customer behavior metrics.

A filter may be used to constrain the unstructured data selected for a specific analysis. A filter may include one or several criteria—an example of a filter is the criteria STORE=[XYZ] which when applied to metadata for a collection of unstructured documents would return only those documents for which attribute STORE has value XYZ.

Using the identified criteria by block 220, a query may be performed in block 235 to retrieve unstructured text associated with the specified criteria from the entire set of available text documents 230.

From this set of text documents 235, qualifying features may be identified, aggregated and quantified in terms of volume, sentiment, customer satisfaction and any other metric used for analysis in block 250.

In block 225, a comparative observation may be determined to use as a baseline, and isolating and quantifying factors may be determined for the comparative observation. As a first step, criteria required to isolate the comparative observation may be identified—criteria include any filters applied in the analysis or any report elements that define the selected data-point. For example, for a monthly trend report where a user observes where sentiment for Store XYZ has dropped on February 2012 criteria to isolate the comparison observation may include MONTH=[JAN 2012] AND STORE=[XYZ]. Details on the steps required to identify a comparison observation is described in subsequent embodiments below.

The baseline may be a system identified comparison set. The baseline may be defined by filters, a set of one or more categorical values, a time period, a numerical associated with the baseline when applying a metric used for measuring the observation. For a trended report, the baseline may be the time period prior to the time period of the selected observation. For a non-trended reports, the baseline may be based on all other data elements other than the selected observation or customers that scored high or low on a customer behavior metric Using criteria identified in block 225, a query may be performed to retrieve all unstructured text associated with the comparison criteria, 240, from the entire set of available text documents 230.

From this set of text documents, 240, qualifying features may be identified, aggregated and quantified in terms of volume, sentiment, customer satisfaction and any other metric used for analysis in block 255. The features identified may include words, word relationships (e.g. a pair of syntactically linked words), topics of discussion, and structured data associated with each document, including locations, products, and document categories. The features may be identified by a natural language processing engine that supports sentence, clause, and word parsing, syntactic parsing to determine word relationships, named entity recognition, and topic categorization Block 260 describes a comparison step between features, and associated aggregated measures, present in the user selected observation and the features, and associated aggregated measures, present in the comparison observation.

Block 265 may rank features from the comparison step 260. In one embodiment of step 265 wherein the selected observation 215 is based on a volume measure, the ranking mechanism may use the following computation for calculating the impact of a certain feature $F_x$:

$$\text{Significance}(F_x) = \\ (1 + \text{chisquare}(T_1, T_0, F_x)) \log_{11}\left(11\left(1 + \left(10 \times \frac{\text{Volume}(T_y, F_x)}{\text{Volume}(T_y)}\right)\right)\right)$$

where:
$T_1$ represents the observation
$T_0$ represents the baseline
$T_y = T_0$ in cases where a dip in volume is being analyzed in trend report.
$T_y = T_1$ otherwise
chisquare($T_1, T_0, F_x$) represents the Chi-Square statistic when comparing feature $F_x$ between the observation $T_1$ and the baseline $T_0$ which may provide an measure of degree which feature $F_x$ more significant when discussing the observation $T_1$ rather than observation $T_0$ or vice-versa. A feature that shows a similar significance for both $T_1$ and $T_0$ shall have a low Chi-Square value and correspondingly a lower overall Significance.

$$\log_{11}\left(11\left(1 + \left(10 \times \frac{\text{Volume}(T_y, F_x)}{\text{Volume}(T_y)}\right)\right)\right)$$

represents a range from a minimum value of 1 (when feature $F_x$ is never found in observation $T_y$) to a maximum value of 2 (when feature $F_x$ is always found with observation $T_y$). This is a weighting measure so that a) when a dip in volume is being analyzed, features that are more frequently found in the baseline $T_0$, are given a higher weighting, b) when a rise in volume is being analyzed, features that are more frequently found in the observation $T_1$ are given a higher weighting For volume based metrics, irrelevant features may be removed by comparing the ratio of the volume of a feature in the baseline to the volume of the baseline to the ratio of volume of a feature in the observation to the volume of the observation as shown below:

If a dip in volume is being analyzed in a trend report, then the following condition should be true in order for feature to be selected as a valid causal candidate because a feature with increasing volume is unlikely cause to explain an overall decrease in volume.

$$\frac{\text{Volume}(T_0, F_x)}{\text{Volume}(T_0)} > \frac{\text{Volume}(T_1, F_x)}{\text{Volume}(T_1)}$$

If an increase in volume is being analyzed in a trend report, the following condition should be true in order for feature to be selected as a valid causal candidate because a feature found less frequently in the baseline is unlikely cause to explain an overall decrease in volume.

$$\frac{\text{Volume}(T_1, F_x)}{\text{Volume}(T_1)} > \frac{\text{Volume}(T_0, F_x)}{\text{Volume}(T_0)}$$

If a non-trend report is being analyzed, the following condition should be true in order for feature to be selected as a valid causal candidate because a feature found more frequently in the baseline is unlikely cause to explain drivers for volume in the selected observation.

$$\frac{\text{Volume}(T_1, F_x)}{\text{Volume}(T_1)} > \frac{\text{Volume}(T_0, F_x)}{\text{Volume}(T_0)}$$

In another embodiment of step 265, if the metric used for the observation is a customer behavior based metric, such as sentiment or customer satisfaction score, and the analysis is on a trended report, then the impact of any one feature $F_x$ can be calculated using the formula below which calculates a significance score:

$$\text{Significance}(F_x) = \frac{\text{MetricValue}(T_1, F_x)\frac{\text{Volume}(T_1, F_x)}{\text{Volume}(T_1)} - \text{MetricValue}(T_0, F_x)\frac{\text{Volume}(T_0, F_x)}{\text{Volume}(T_0)}}{\text{MetricVolume}(T_1) - \text{MetricValue}(T_0)}$$

where:
$T_1$ represents the observation
$T_0$ represents the baseline
MetricValue($T_1, F_x$) represents the customer behavior metric value when feature $F_x$ is found in observation $T_1$.
MetricValue($T_0, F_x$) represents the customer behavior metric value when feature $F_x$ is found in observation $T_0$.

MetricValue($T_1$) represents the customer behavior metric value for observation $T_1$.

MetricValue($T_0$) represents the customer behavior metric value for observation $T_0$.

$$MetricValue(T_0, F_x)\frac{\text{Volume}(T_0, F_x)}{\text{Volume}(T_0)}$$

represents a normalized value for the customer behavior metric when feature $F_x$ is found in an observation $T_0$ (after factoring in the volume of comments in which feature $F_x$ is referenced).

$$MetricValue(T_1, F_x)\frac{\text{Volume}(T_1, F_x)}{\text{Volume}(T_1)}$$

represents a normalized value for the customer behavior metric when feature $F_x$ is found in observation $T_1$ (after factoring in the volume of comments in which feature $F_x$ is referenced).

$$MetrixValue(T_1, F_x)\frac{\text{Volume}(T_1, F_x)}{\text{Volume}(T_1)} - MetricValue(T_0, F_x)\frac{\text{Volume}(T_0, F_x)}{\text{Volume}(T_0)}$$

represents the impact that feature has on the overall change in the customer behavior metric (i.e. from MetricValue($T_0$) to MetricValue($T_1$)).

For customer behavior based metrics in trend reports, irrelevant features may be discarded by comparing a metric value of a feature in the baseline to a metric value of a feature in the observation as shown below:

If a dip is the customer behavior metric is being analyzed in a trend report, then the following condition should be true for feature to be selected as a valid causal candidate because a feature for which value of the customer behavior metric increases between the baseline and observation cannot be a causal factor in explaining an overall decrease in the customer behavior metric.

MetricValue($T_0,F_x$)>MetricValue($T_1,F_x$)

If an increase in the customer behavior metric is being analyzed in a trend report, then the following condition should be true for feature $F_x$ to be selected as a a valid causal candidate because a feature for which value of the customer behavior metric decreases between the baseline and observation cannot be a causal factor in explaining an overall increase in the customer behavior metric.

MetricValue($T_1,F_x$)>MetricValue($T_0,F_x$)

In another embodiment of step 265, if the metric used for the observation is a customer behavior based metric, such as sentiment or customer satisfaction score, and the analysis is on a non-trended report, then the impact of any one feature $F_x$ can be calculated using the formula below which calculates a significance score:

$$\text{Significance}(F_x) = \frac{MetricValue(T_1, F_x)\frac{\text{Volume}(T_1, F_x)}{\text{Volume}(T_1)} - MetricValue(T_0, F_x)\frac{\text{Volume}(T_0, F_x)}{\text{Volume}(T_0)}}{MetricValue(T_1) - MetricValue(T_0)}$$

where:
$T_1$ represents the observation
$T_0$ represents the baseline
MetricValue($T_1,F_x$) represents the customer behavior metric value when feature $F_x$ is found in observation $T_1$.
MetricValue($T_0,F_x$) represents the customer behavior metric value when feature $F_x$ is found in observation $T_0$.
MetricValue($T_1$) represents the customer behavior metric value for observation $T_1$.
MetricValue($T_0$) represents the customer behavior metric value for observation $T_0$.

$$MetricValue(T_0, F_x)\frac{\text{Volume}(T_0, F_x)}{\text{Volume}(T_0)}$$

represents a normalized value for the customer behavior metric when feature $F_x$ is found in observation $T_0$ (after factoring in the volume of comments in which feature $F_x$ is referenced).

$$MetricValue(T_1, F_x)\frac{\text{Volume}(T_1, F_x)}{\text{Volume}(T_1)}$$

represents a normalized value for the customer behavior metric when feature $F_x$ is found in observation $T_1$ (after factoring in the volume of comments in which feature $F_x$ is referenced).

$$MetricValue(T_1, F_x)\frac{\text{Volume}(T_1, F_x)}{\text{Volume}(T_1)} - MetricValue(T_0, F_x)\frac{\text{Volume}(T_0, F_x)}{\text{Volume}(T_0)}$$

represents the impact that feature has on the overall change in the customer behavior metric (i.e. from MetricValue($T_0$) to MetricValue($T_1$)).

For customer behavior based metrics in non-trend reports, irrelevant features may be discarded:

If the selected observation maps to a positive measure (e.g. positive sentiment, great satisfaction etc), then the customer behavior metric when feature $F_x$ is found, should also be a positive measure to be selected as a valid causal candidate. This is because a feature for which the customer behavior metric is a negative measure cannot explain an overall positive observation.

If the selected observation maps to a negative measure (e.g. positive sentiment, great satisfaction etc), then the customer behavior metric when feature $F_x$ is found, should also be a negative measure to be selected as a valid causal candidate. This is because a feature for which the customer behavior metric is a positive measure cannot explain an overall negative observation.

Figure 3:
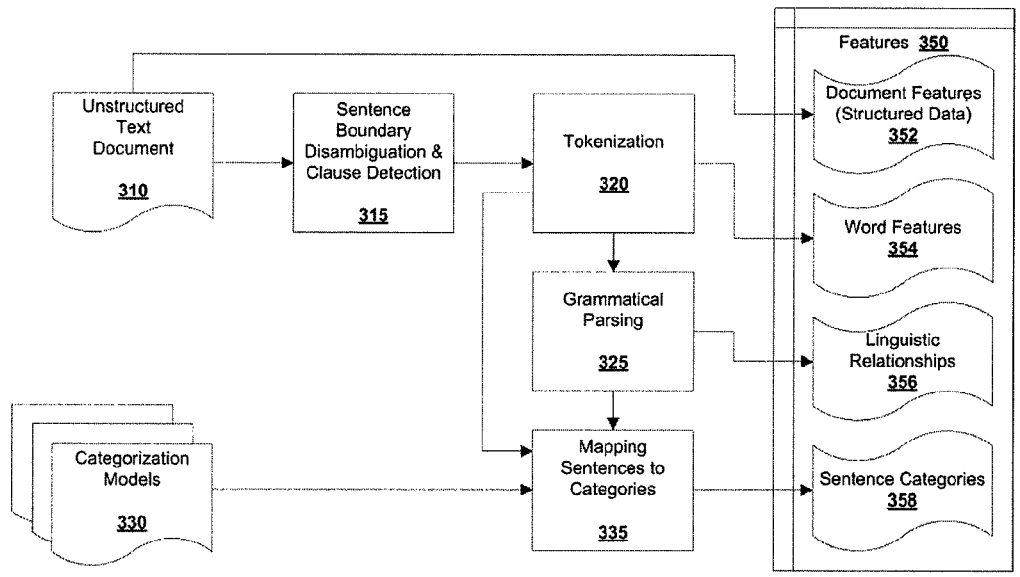
FIG. 3 depicts an exemplary logic flow 300 for of extracting features from unstructured text data in accordance with one or more embodiments.

FIG. 3 depicts an exemplary logic flow 300 for of extracting features from unstructured text data in accordance with one or more embodiments. The features are possible candidates as causal factors in the output of root cause analysis. Possible feature types include, but are not limited to, category topics of discussion derived from unstructured text, semantic concepts, lexical terms and structured data.

Features 350 represents a set of features that may be used as possible causal factors in explaining an anomaly—these may include document features 352, word features 354, linguistic relationships 356 and sentence categories 358.

From an unstructured text document 310, document metadata or structured data features 352 may be derived.

From an unstructured text document 310, natural language processing steps, sentence boundary disambiguation and clause detection, 315, may be performed to break down a document into sentence details and where applicable into clause details.

Sentences and clauses data from 315 may be further resolved into words using a tokenization step 320. Words may be assigned a part of speech (i.e. grammatical role in the sentence or clause).

From words data from 320, word features 354 may be derived. These may be key words performing grammatical roles such as nouns, verbs, adjectives or adverbs.

Between words extracted from step 320, grammatical relationships may be established using grammatical parsing 325.

From grammatical relationships from step 325, relevant relationships are selected as linguistic relationship features in step 356. Relevant relationships include but are not limited to adjective-noun relationships, verb-noun relationships and noun-noun relationships.

Using a predefined categorization model 330, sentences from step 315 may be mapped to a category topic in step 335. The mapping may be applied using predefined mapping rules that are part of model 330 or may be applied using a trained machine learning model. The sentence categories may be extracted as features in step 358.

In some embodiments of the apparatus a user may initiate discovery of root cause behind a specific observation in time-trended report.

In some embodiments of the apparatus a user may initiate discovery of root cause behind normalized volume of an observation in a non-trended report.

In some embodiments of the apparatus a user may initiate discovery of root cause behind sentiment of an observation in a non-trended report.

In some embodiments of the apparatus a user may initiate discovery of root cause behind satisfaction score of an observation in a non-trended report.

Figure 4:
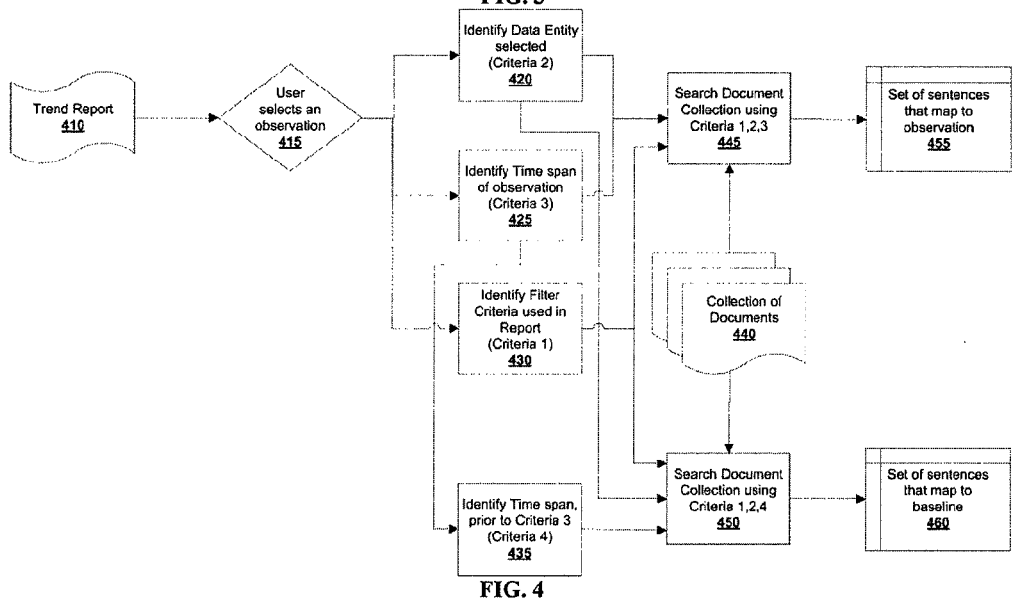
FIG. 4 depicts an exemplary logic flow 400 for mapping sentences to observations and baselines for a trend report in accordance with one or more embodiments.

FIG. 4 depicts an exemplary logic flow 400 for mapping sentences to observations and baselines for a trend report 410 where a user instructs the apparatus to determine cause for observation 415 in accordance with one or more embodiments.

In block 420, criteria relating to any entities that pertain to observation 415 may be identified. For example, for a monthly trend report of a sentiment measure on "level of service" where a user observes sentiment for Store XYZ has dropped on February 2012, criteria to isolate the selected entity for the observation may include STORE=[XYZ].

In block 425, criteria relating to time factors of observation 415 may be identified. For example, for a monthly trend report of a sentiment measure on "level of service" where a user observes sentiment for Store XYZ has dropped on February 2012 criteria to isolate the selected time window for the observation may include MONTH=[FEB 2012].

In block 435, criteria relating to a suitable comparison baseline against observation 415 may be identified. In some embodiments, this may be the immediate previous time window prior to the selected observation. For example, for a monthly trend report of a sentiment measure on "level of service" where a user observes sentiment for Store XYZ has dropped on February 2012, criteria to isolate the selected time window for the observation may include MONTH=[JAN 2012].

In block 430, criteria relating to filters applied to report 410 may be identified. For example, for a monthly trend report of a sentiment measure on "level of service" where a user observes sentiment for Store XYZ has dropped on February 2012 criteria to isolate the selected time window for the observation may include CATEGORY=["level of service"].

In order to identify sentences that are impacted by the selected observation 455, the apparatus may create a conjunction of criteria from 420, 425 and 430.

In order to identify sentences that are impacted by the comparison observation 460, the apparatus creates may create conjunction of criteria from 420, 430 and 435.

In the case of a volume based trend report, in which the observed anomaly is an upward spike in volume, the criteria identified from the comparison may be those factors that demonstrate a statistical tendency to be more prevalent in the anomaly when compared with the prior observation.

In the case of a volume based trend report, in which the observed anomaly is a downward drop in volume, the criteria identified from the comparison may be those factors that demonstrate a statistical tendency to be more prevalent in the prior observation when compared against the anomaly.

In the case of a sentiment based trend report, in which the observed anomaly is an increase in sentiment, the criteria identified from the comparison may be those that factors that by themselves show an increase in sentiment from the prior observation to the selected observation.

In the case of a sentiment based trend report, in which the observed anomaly is a decrease in sentiment, the criteria identified from the comparison may be those that factors that by themselves show a decrease in sentiment from the prior observation to the selected observation.

In the case of a satisfaction measure based trend report, in which the observed anomaly is an increase in satisfaction, the criteria identified from the comparison may be those that factors that by themselves show an increase in satisfaction from the prior observation to the selected observation.

In the case of a satisfaction measure based trend report, in which the observed anomaly is a decrease in satisfaction, the criteria identified from the comparison may be those that factors that by themselves show a decrease in satisfaction from the prior observation to the selected observation.

Figure 5:
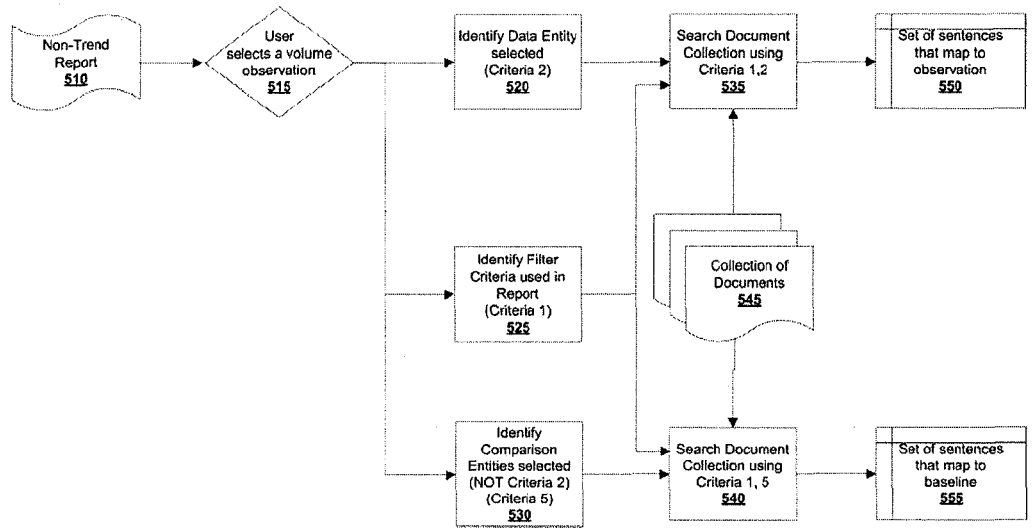
FIG. 5 depicts an exemplary logic flow 500 for mapping sentences to observations and baselines for a non-trend report where a user selects a volume observation to explain in accordance with one or more embodiments.

FIG. 5 depicts an exemplary logic flow 500 for mapping sentences to observations and baselines for a non-trend report where a user selects a volume observation to explain in accordance with one or more embodiments. Logic flow 500 begins in block 515, in which a user may select an observed anomaly in a non-trend report 510, and to provide an instruction to the apparatus to compute factors that can explain the anomaly.

In block 520, criteria relating to any entities that pertain to observation 515 are identified. For example, for a volume report of all stores in region ABC in which a user selects an observation about volume for store XYZ, criteria to isolate the selected entity for the observation may include STORE=[XYZ].

In block 530, criteria relating to a suitable comparison baseline against observation 515 are identified. In some embodiments, this may be all other observations on the report other than the selected observation. For example, for a volume report of all stores in region ABC in which a user selects an observation about volume for store XYZ, criteria to isolate the selected entity for the observation may include STORE=[PQR, STU] where PQR and STU are other stores in region ABC.

In block 525, criteria relating to filters applied to report 510 are identified. For example, for a volume report of all stores in region ABC in which a user selects an observation about volume for store XYZ, criteria to isolate the selected entity for the observation may include REGION=[ABC].

In order to identify sentences that are impacted by the selected observation 550, the apparatus creates a conjunction of criteria from 520, and 525.

In order to identify sentences that are impacted by the comparison observation 555, the apparatus creates a conjunction of criteria from 525, and 530.

Figure 6:
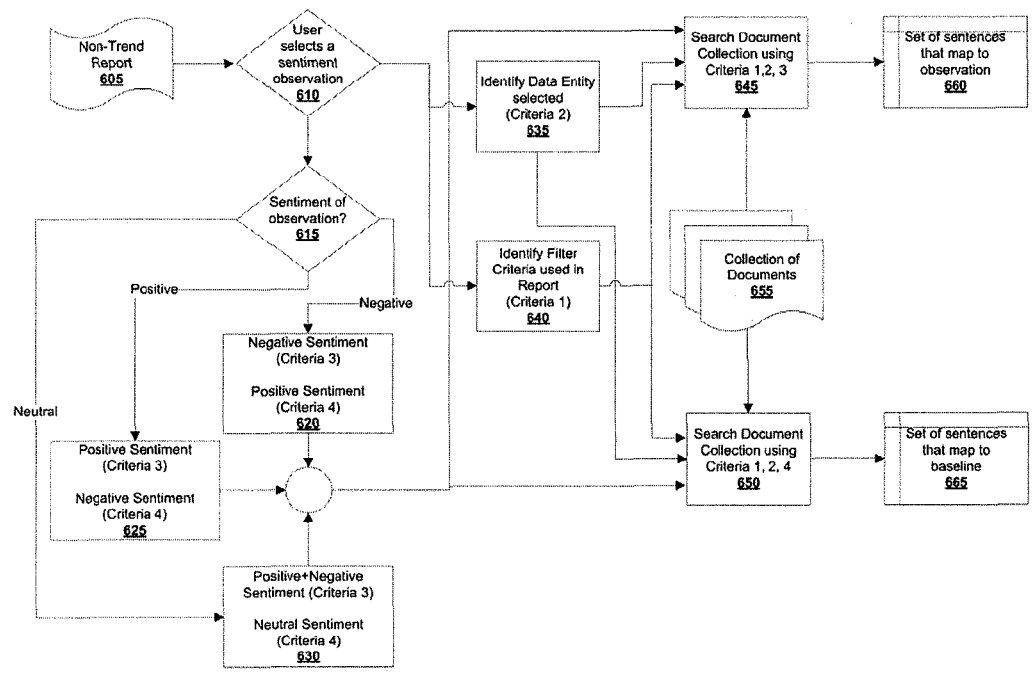
FIG. 6 depicts an exemplary logic flow 600 for mapping sentences to observations and baselines for a non-trend report where a user selects a sentiment observation to explain in accordance with one or more embodiments.

FIG. 6 depicts an exemplary logic flow 600 for mapping sentences to observations and baselines for a non-trend report where a user selects a sentiment observation to explain in accordance with one or more embodiments. Logic flow 600 begins in block 610, in which a user may select an observed anomaly on a sentiment measure in a non-trend report 605, and to provide an instruction to the apparatus to compute factors that can explain the anomaly.

In block 635, criteria relating to any entities that pertain to observation 610 are identified. For example, for a sentiment report of all stores in region ABC in which a user selects an observation about sentiment for store XYZ, criteria to isolate the selected entity for the observation may include STORE=[XYZ].

In block 640, criteria relating to filters applied to report 610 are identified. For example, for a sentiment report of all stores in region ABC in which a user selects an observation about sentiment for store XYZ, criteria to isolate the selected entity for the observation may include REGION=[ABC].

In block 620, criteria relating to any entities that pertain to observation 610 are identified where the sentiment of the observation is negative (e.g. bad). For example, for a sentiment report of all stores in region ABC in which a user selects an observation about negative sentiment for store XYZ, criteria to isolate the selected entity for the observation may include SENTIMENT=[negative].

In block 620, criteria relating to a suitable comparison baseline against observation 610 are identified where the sentiment of the observation is positive (e.g. good). For example, for a sentiment report of all stores in region ABC in which a user selects an observation about positive sentiment for store XYZ, criteria to isolate the selected entity for the observation may include SENTIMENT=[positive].

In block 625, criteria relating to any entities that pertain to observation 610 are identified where the sentiment of the observation is positive (e.g. good). For example, for a sentiment report of all stores in region ABC in which a user selects an observation about positive sentiment for store PQR, criteria to isolate the selected entity for the observation may include SENTIMENT=[positive].

In block 625, criteria relating to a suitable comparison baseline against observation 610 are identified where the sentiment of the observation is negative (e.g. bad). For example, for a sentiment report of all stores in region ABC in which a user selects an observation about negative sentiment for store PQR, criteria to isolate the selected entity for the observation may include SENTIMENT=[negative].

In block 630, criteria relating to any entities that pertain to observation 610 are identified where the sentiment of the observation is neutral (i.e. neither good nor bad). For example, for a sentiment report of all stores in region ABC in which a user selects an observation about negative sentiment for store STU, criteria to isolate the selected entity for the observation may include SENTIMENT=[positive or negative].

In block 630, criteria relating to a suitable comparison baseline against observation 610 are identified where the sentiment of the observation is neutral (i.e. neither good nor bad). For example, for a sentiment report of all stores in region ABC in which a user selects an observation about negative sentiment for store PQR, criteria to isolate the selected entity for the observation may include SENTIMENT=[neutral].

In order to identify sentences that are impacted by the selected observation 660, the apparatus creates a conjunction of criteria from 635, 640 and criteria 3 from either of 620/625/630 depending on whether the selected observation pertains to positive, negative or neutral sentiment respectively.

In order to identify sentences that are impacted by the comparison or baseline observation 665, the apparatus creates a conjunction of criteria from 635, 640 and criteria 4 from either of 620/625/630 depending on whether the selected observation pertains to positive, negative or neutral sentiment respectively.

In the case of the observed anomaly being an overall negative sentiment expressed for a concept, then first all expressions of negative sentiment may be isolated, all other criteria remaining the same, then all expressions of positive sentiment may be isolated, all other criteria remaining the same. The aggregated features from the negative expressions may be statistically compared with the aggregated features from the positive expressions across a set of comparison criteria.

In the case of the observed anomaly being an overall positive sentiment expressed for a concept, then first all expressions of positive sentiment may be isolated, all other criteria remaining the same, then all expressions of negative sentiment may be isolated, all other criteria remaining the same. The aggregated features from the positive expressions may be statistically compared with the aggregated features from the negative expressions across a set of comparison criteria.

In the case of the observed anomaly being an overall neutral sentiment expressed for a concept, then first all expressions of positive or negative sentiment may be isolated, all other criteria remaining the same, then all expressions of neutral sentiment may be isolated, all other criteria remaining the same. The aggregated features from the negative or positive expressions may be statistically compared with the aggregated features from the neutral expressions across a set of comparison criteria.

Figure 7:
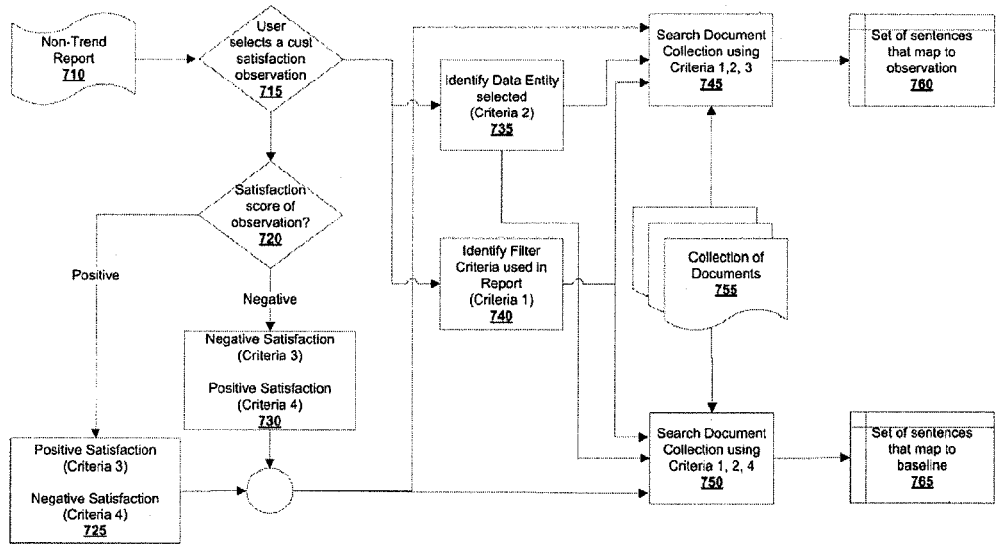
FIG. 7 depicts an exemplary logic flow 700 for mapping sentences to observations and baselines for a non-trend report where a user selects a satisfaction observation to explain in accordance with one or more embodiments.

FIG. 7 depicts an exemplary logic flow 700 for mapping sentences to observations and baselines for a non-trend report where a user selects a satisfaction observation to explain in accordance with one or more embodiments. Logic flow 700 may begin in block 715, in which a user may select an observed anomaly on a customer satisfaction score measure in a non-trend report 710, and to provide an instruction to the apparatus to compute factors that can explain the anomaly.

In block 735, criteria relating to any entities that pertain to observation 710 are identified. For example, for a satisfaction score report of all stores in region ABC in which a user selects an observation about satisfaction score for store XYZ, criteria to isolate the selected entity for the observation may include STORE=[XYZ].

In block 740, criteria relating to filters applied to report 710 are identified. For example, for a satisfaction score report of all stores in region ABC in which a user selects an observation about satisfaction score for store XYZ, criteria to isolate the selected entity for the observation may include REGION=[ABC].

In block 720, criteria relating to any entities that pertain to observation 710 are identified where the satisfaction score of the observation is poor (i.e. bad). For example, for a satisfaction score report of all stores in region ABC in which a user selects an observation about poor satisfaction score for store XYZ, criteria to isolate the selected entity for the observation may include SATISFACTION=[poor].

In block 720, criteria relating to a suitable comparison baseline against observation 710 are identified where the satisfaction score of the observation is poor (i.e. bad). For example, for a satisfaction score report of all stores in region ABC in which a user selects an observation about poor satisfaction score for store XYZ, criteria to isolate the selected entity for the observation may include SATISFACTION=[high].

In block 725, criteria relating to any entities that pertain to observation 710 are identified where the satisfaction of the observation is high (i.e. good). For example, for a satisfaction score report of all stores in region ABC in which a user selects an observation about high satisfaction for store PQR, criteria to isolate the selected entity for the observation may include SATISFACTION=[high].

In block 725, criteria relating to a suitable comparison baseline against observation 710 are identified where the satisfaction of the observation is high (i.e. good). For example, for a satisfaction score report of all stores in region ABC in which a user selects an observation about high satisfaction for store PQR, criteria to isolate the selected entity for the observation may include SATISFACTION=[poor].

In order to identify sentences that are impacted by the selected observation 760, the apparatus creates a conjunction of criteria from 735, 740 and criteria 3 from either of 730/725 depending on whether the selected observation pertains to high or poor satisfaction respectively.

In order to identify sentences that are impacted by the comparison or baseline observation 765, the apparatus creates a conjunction of criteria from 735, 740 and criteria 4 from either of 730/725 depending on whether the selected observation pertains to high or poor satisfaction respectively.

In the case of the observed anomaly being an overall negative satisfaction expressed for a concept, then first all expressions of negative satisfaction may be isolated, all other criteria remaining the same, then all expressions of positive satisfaction may be isolated, all other criteria remaining the same. The aggregated features from the negative expressions may be statistically compared with the aggregated features from the positive expressions across a set of comparison criteria.

In the case of the observed anomaly being an overall positive satisfaction expressed for a concept, then first all expressions of positive satisfaction may be isolated, all other criteria remaining the same, then all expressions of negative satisfaction may be isolated, all other criteria remaining the same. The aggregated features from the positive expressions may be statistically compared with the aggregated features from the negative expressions across a set of comparison criteria.

Figure 8:
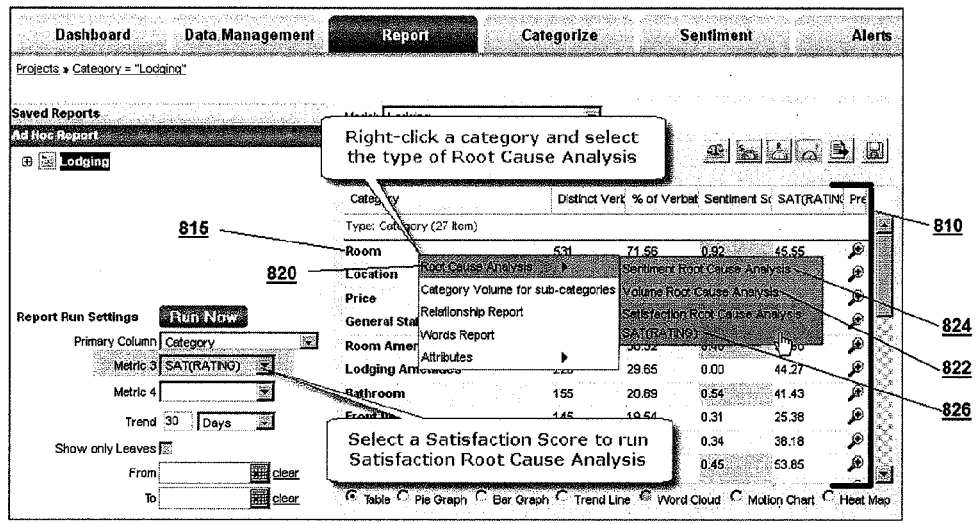
FIG. 8 depicts an exemplary user interface 800 for a report and analysis application where an option is provided on a report visualization to determine root cause for a selected observation in accordance with one or more embodiments.

FIG. 8 depicts an exemplary user interface 800 for a report and analysis application where an option is provided on a report visualization to determine root cause for a selected observation in accordance with one or more embodiments. User interface 800 includes a report 810, an observation on the report 815, a mechanism for the user, or viewer of report 810, to instruct the system to calculate root cause 820. In this example, the report 810 is a non-trended report and the user has an option to run root cause on either the volume measure 822, on the sentiment measure 824, or on the satisfaction score measure 826.

Figure 9:
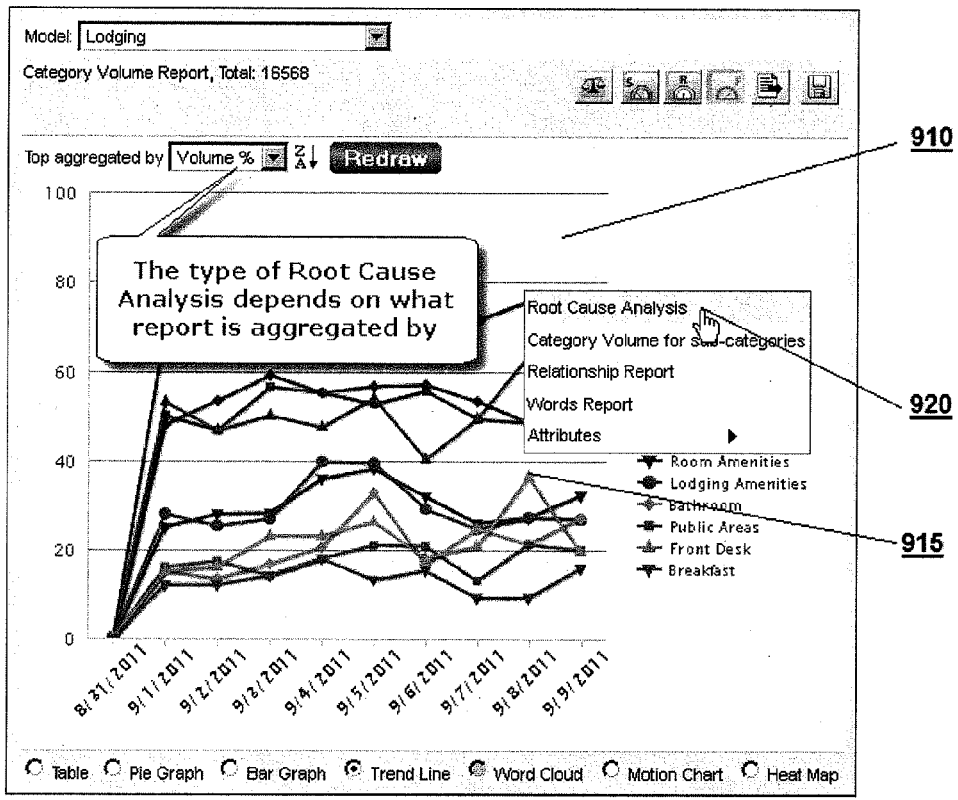
FIG. 9 depicts an exemplary user interface 900 for a report and analysis application where an option is provided on a time trended report visualization to determine root cause for a selected observation in accordance with one or more embodiments.

FIG. 9 depicts an exemplary user interface 900 for a report and analysis application where an option is provided on a time trended report visualization to determine root cause for a selected observation in accordance with one or more embodiments. User interface 900 includes a report 910, an observation on the report 915 and a mechanism for the user or viewer of report 910 to instruct the system to calculate root cause, 920.

Figure 10:
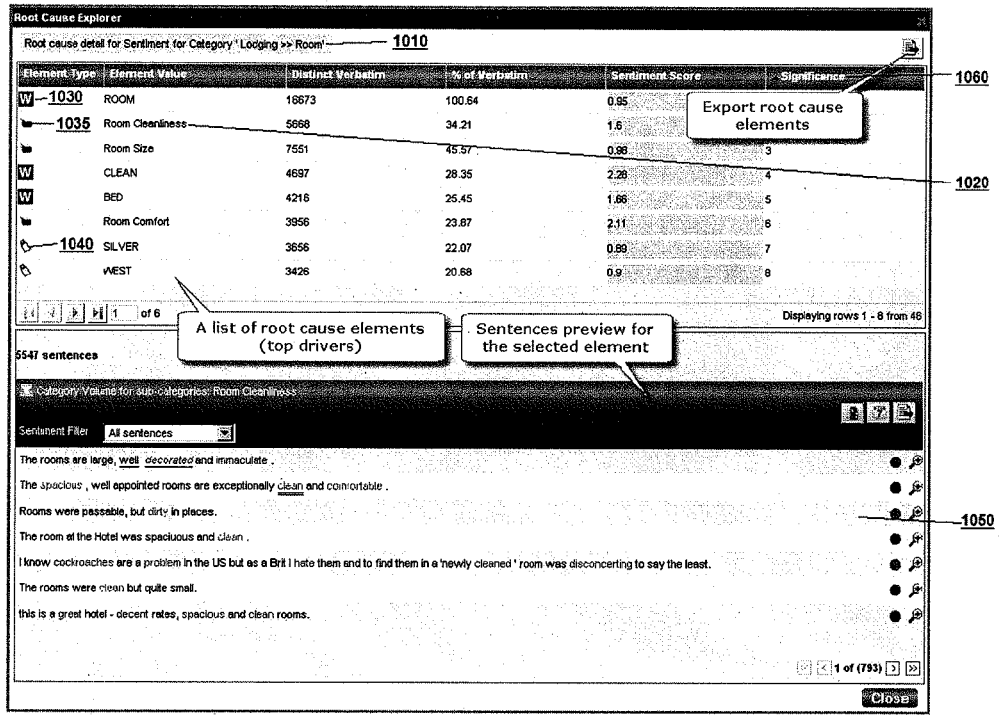
FIG. 10 depicts an exemplary user interface 1000 including root cause factors presented as a result of computing root cause on a report observation in accordance with one or more embodiments.

FIG. 10 depicts an exemplary user interface 1000 including root cause factors presented as a result of computing root cause on a report observation in accordance with one or more embodiments. User interface 1000 includes a title 1010 explaining the observation on which root cause was computed, a list of causal factors including 1020 "Room Cleanliness" which is determined to be a causal factor driving the volume of comments for category "Room", different types of causal factors such as words 1030, categories 1035, structured attributes 1040, a significance computation to rank the significance, 1060, of each causal factor where a lower rank indicates greater significance, a means to preview sentences pertaining to a selected causal factor, 1050.

Figure 11:
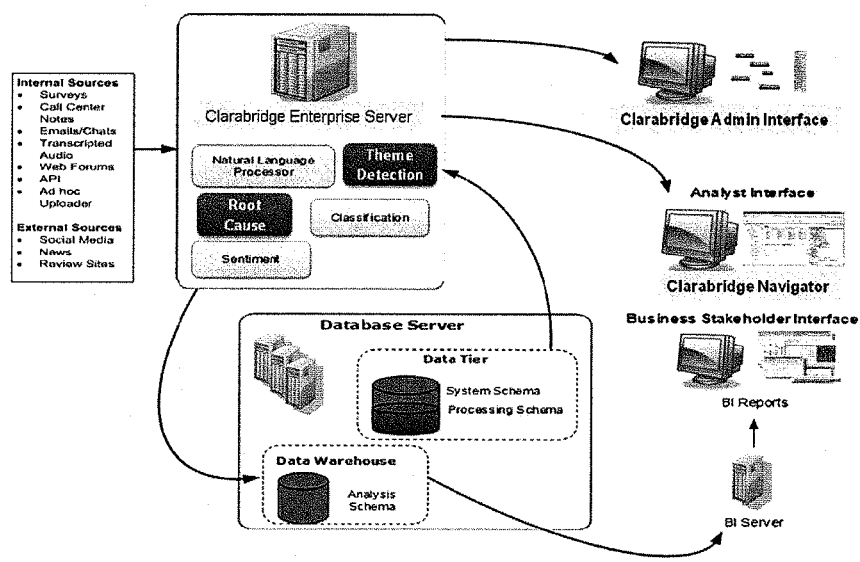
FIG. 11 depicts an exemplary system 1100 in accordance with one or more embodiments.

FIG. 11 depicts an exemplary system 1100 in accordance with one or more embodiments. The elements of system 1100 may operate similarly to those depicted and/or described with respect to system 100.

Figure 12:
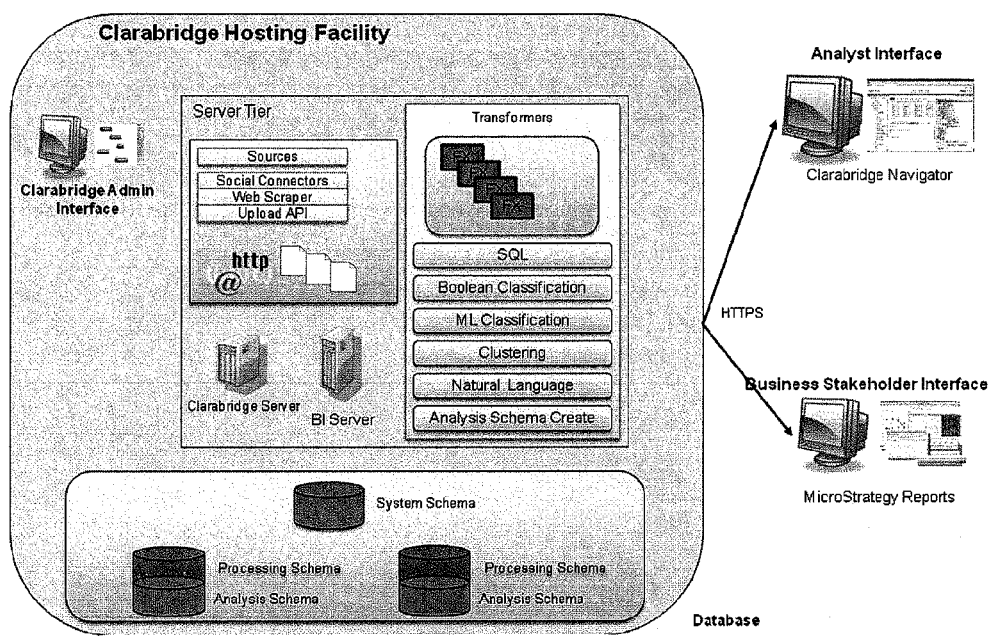
FIG. 12 depicts an exemplary system 1200 in accordance with one or more embodiments.

FIG. 12 depicts an exemplary system 1200 in accordance with one or more embodiments. System 1200 may represent one or more embodiments in which system 100 is deployed in a multi-tenant software-as-a-services (SaaS) configuration.

Figure 13:
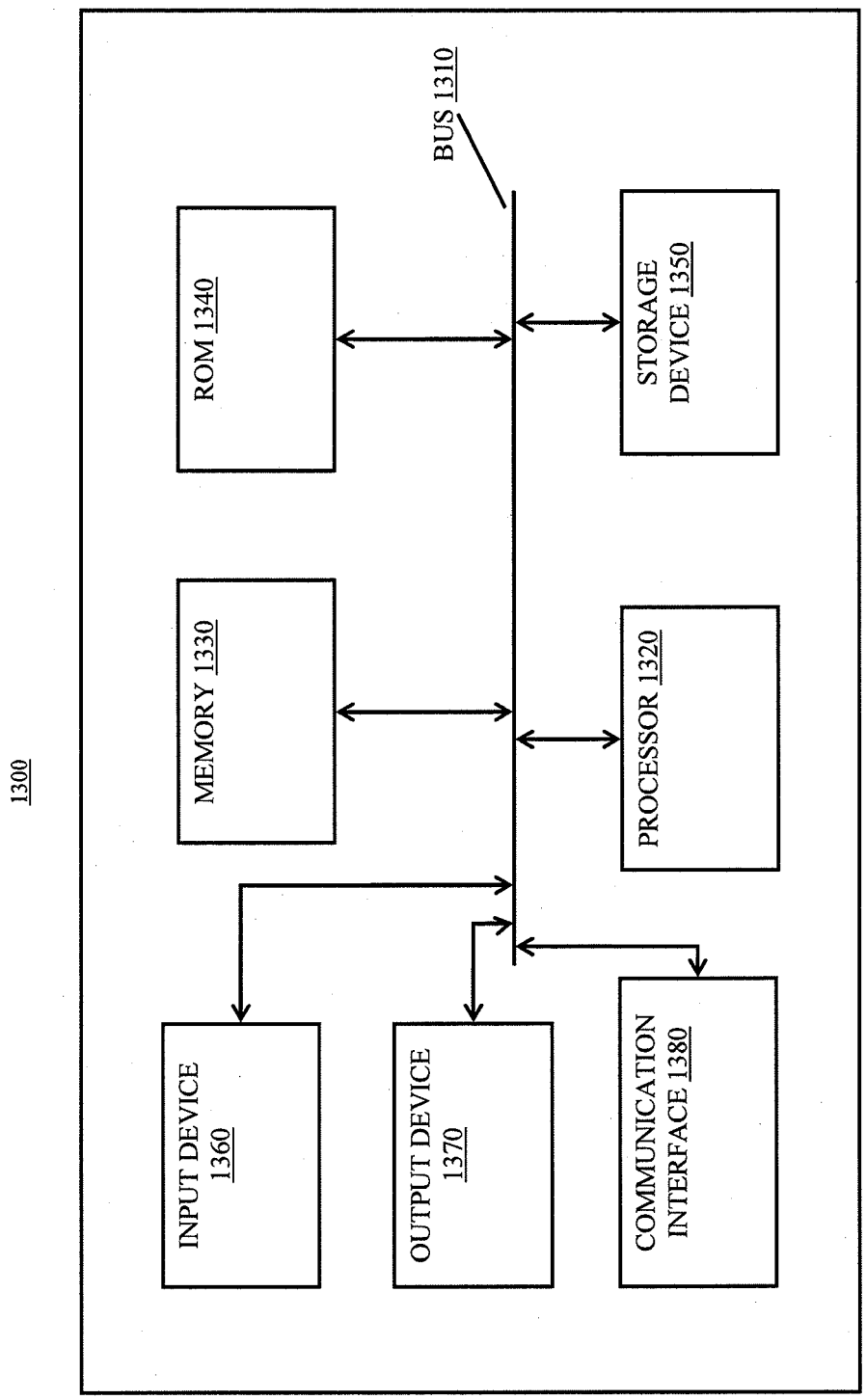
FIG. 13 depicts an exemplary architecture for implementing a computing device 1300 in accordance with one or more embodiments.

FIG. 13 depicts an exemplary architecture for implementing a computing device 1300 in accordance with one or more embodiments, which may be used to implement any of enterprise server 110, database server 120, one or more external sources 130, one or more internal sources 140, navigator device 150, administrator device 160, business intelligence server 170, and business intelligence report device 180, or any other computer system or computing device component thereof. It will be appreciated that other devices that can be used with the computing device 1300, such as a client or a server, may be similarly configured. As illustrated in FIG. 13, computing device 1300 may include a bus 1310, a processor 1320, a memory 13 30, a read only memory (ROM) 1340, a storage device 1350, an input device 1360, an output device 1370, and a communication interface 1380.

Bus 1310 may include one or more interconnects that permit communication among the components of computing device 1300. Processor 1320 may include any type of processor, microprocessor, or processing logic that may interpret and execute instructions (e.g., a field programmable gate array (FPGA)). Processor 1320 may include a single device (e.g., a single core) and/or a group of devices (e.g., multi-core). Memory 1330 may include a random access memory (RAM) or another type of dynamic storage device that may store information and instructions for execution by processor 1320. Memory 1330 may also be used to store temporary variables or other intermediate information during execution of instructions by processor 1320.

ROM 1340 may include a ROM device and/or another type of static storage device that may store static information and instructions for processor 1320. Storage device 1350 may include a magnetic disk and/or optical disk and its corresponding drive for storing information and/or instructions. Storage device 1350 may include a single storage device or multiple storage devices, such as multiple storage devices operating in parallel. Moreover, storage device 1350 may reside locally on the computing device 1300 and/or may be remote with respect to a server and connected thereto via network and/or another type of connection, such as a dedicated link or channel.

Input device 1360 may include any mechanism or combination of mechanisms that permit an operator to input information to computing device 1300, such as a keyboard, a mouse, a touch sensitive display device, a microphone, a pen-based pointing device, and/or a biometric input device, such as a voice recognition device and/or a finger print scanning device. Output device 1370 may include any mechanism or combination of mechanisms that outputs information to the operator, including a display, a printer, a speaker, etc.

Communication interface 1380 may include any transceiver-like mechanism that enables computing device 1300 to communicate with other devices and/or systems, such as a client, a server, a license manager, a vendor, etc. For example, communication interface 1380 may include one or more interfaces, such as a first interface coupled to a network and/or a second interface coupled to a license manager. Alternatively, communication interface 1380 may include other mechanisms (e.g., a wireless interface) for communicating via a network, such as a wireless network. In one implementation, communication interface 1380 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 1300 may perform certain functions in response to processor 1320 executing software instructions contained in a computer-readable medium, such as memory 1330. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

As will be appreciated by one of skill in the art, aspects of the present invention may be embodied as a method, data processing system, or computer program product. Accordingly, aspects of the present invention may take the form of an entirely hardware embodiment or an embodiment combining software and hardware aspects, all generally referred to herein as system. Furthermore, elements of the present invention may take the form of a computer program product on a computer-usable storage medium having computer-usable program code embodied in the medium. Any suitable computer readable medium may be utilized, including hard disks, CD-ROMs, optical storage devices, flash RAM, transmission media such as those supporting the Internet or an intranet, or magnetic storage devices.

Computer program code for carrying out operations of the present invention may be written in an object oriented programming language such as JAVA, C#, Smalltalk or C++, or in conventional procedural programming languages, such as the Visual Basic or "C" programming language. The program code may execute entirely on the user's computer, partly on the user's computer, as a stand-alone software package, partly on the user's computer and partly on a remote computer, or entirely on the remote computer, or partially or entirely on a cloud environment. In the latter scenarios, the remote computer or cloud environments may be connected to the user's computer through a local area network (LAN) or a wide area network (WAN), or the connection may be made to an external computer (for example, through the Internet using an Internet Service Provider).

Aspects of the present invention are described with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, server, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer, server or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks, and may operate alone or in conjunction with additional hardware apparatus.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A system for determining causal factors in unstructured data, the system comprising:
   an unstructured data collection component configured to collect unstructured data from one or more sources of text;
   a natural language processing component configured to process text from the unstructured data to extract features from the unstructured data;
   a report generation component configured to generate a report based on features extracted from the unstructured data;
   a report presentation component configured to present the report to an operator and to allow the operator to select an observation from the report;
   a root cause component configured to determine one or more causal factors associated with the observation by calculating an impact of one or more of the features of the unstructured data on the observation selected by the operator using a baseline for comparison with the observation selected, the baseline being determined by the operator as either data comprising one or more features in which the observation is not present or data originating in a particular time period comprising one or more features in which the observation is present, and the impact on a measurable characteristic of the observation selected being calculated based on a comparison of one or more of the features of the unstructured data associated with the presence of the observation and features of the unstructured data associated with the baseline, the measurable characteristic being a volume-based metric, a sentiment metric, a satisfaction metric, or another user-defined metric, at least one of the one or more causal factors comprising one or more of the features;
   a memory configured to store the unstructured data collection component, the natural language processing component, the report generation component, the report presentation component, and the root cause component; and
   at least one processor to implement the unstructured data collection component, the natural language processing component, the report generation component, the report presentation component, and the root cause component.

2. The system of claim 1, further comprising:
   an unstructured data categorization component configured to classify the unstructured data thereby associating the unstructured data with one or more topic features;
   wherein at least one of the one or more causal factors is selected by the root cause component from the topic features.

3. The system of claim 1, further comprising:
   an unstructured metadata component configured to determine structured data features associated with an unstructured text document of the unstructured data;
   wherein at least one of the one or more causal features is selected by the root cause component from the structured data features.

4. The system of claim 1, further comprising:
   a sentiment computation component configured to determine sentiment associated with the unstructured data.

5. The system of claim 1, further comprising:
   an interface to display causal factors associated with the observation.

6. The system of claim 5, further comprising:
   a second interface to display associated unstructured data associated with a selected causal factor.

7. The system of claim 1, further comprising:
   a sentence detection component configured to determine sentences within an unstructured text document;
   a tokenization component configured to extract tokens from the sentences;
   a part-of-speech tagging component configured to associate grammatical roles to tokens in the sentences;
   a grammatical parsing component configured to determine grammatical relationships between tokens in the sentences; and wherein at least one of the one or more causal factors is selected by the root cause component from at least one of the tokens or at least one of the grammatical relationships.

8. A method of determining one or more causal factors for an observation comprising:
accessing unstructured data from one or more sources of text;
processing text from the unstructured data to extract features from the unstructured data;
receiving an instruction from a user to execute a report based on features extracted from the unstructured data;
receiving an instruction to determine the one or more causal factors associated with an observation from the report that is selected by the user;
determining, by a processor, a baseline for comparison with the selected observation, the baseline being determined by the user as either data comprising one or more features in which the observation is not present or the data originating in a particular time period comprising one or more features in which the observation is present;
determining, by a processor, the one or more causal factors associated with the selected observation by calculating an impact of one or more of the features of the unstructured data on the observation selected by the user using the baseline for comparison with the observation selected, at least one of the one or more causal factors comprising one or more of the features, and the impact on a measurable characteristic of the observation selected being calculated based on a comparison of one or more of the features of the unstructured data associated with the presence of the observation and features of the unstructured data associated with the baseline, the measurable characteristic being a volume-based metric, a sentiment metric, a satisfaction metric, or another user-defined metric;
ranking, by the processor, the one or more causal factors based on a measure of statistical association to the selected observation; and
presenting results to the user.

9. The method of claim 8, wherein the one or more causal features comprise at least one of a lexical feature, a grammatical feature, and a semantic feature.

10. The method of claim 8, further comprising:
aggregating the extracted features to determine a measure of volume.

11. The method of claim 8, further comprising:
associating the observation selected by the user with an unstructured text document of the unstructured data, wherein the features extracted from the unstructured data comprise features extracted from the unstructured text document; and
selecting the features extracted from the unstructured text document associated with the observation selected by the user as candidate causal factors.

12. The method of claim 8, further comprising:
categorizing the unstructured data into category topics.

13. The method of claim 12, further comprising:
aggregating category topics to provide a measure of volume.

14. The method of claim 11, further comprising:
selecting category topics from unstructured text documents associated with the observation as candidate causal factors.

15. The method of claim 8, further comprising:
extracting metadata from unstructured text documents.

16. The method of claim 15, further comprising:
aggregating metadata values to provide a measure of volume.

17. The method of claim 15, further comprising:
selecting metadata values from unstructured text document metadata associated with the observation as candidate causal factors.

18. The method of claim 8, further comprising:
computing sentiment on unstructured text data; and
analyzing an aggregation of extracted features to provide a measure of sentiment.

19. The method of claim 12, further comprising:
computing a sentiment on the unstructured text data; and
analyzing an aggregation of category topics to provide a measure of sentiment.

20. The method of claim 15, further comprising:
computing a sentiment on the unstructured text data; and
analyzing an aggregation of metadata values to provide a measure of sentiment.

21. The method of claim 8, further comprising:
deriving a satisfaction rating from unstructured document metadata; and
analyzing an aggregation of extracted features to provide a measure of overall satisfaction.

22. The method of claim 12, further comprising:
deriving a satisfaction rating from unstructured document metadata; and
analyzing an aggregation of category topics to provide a measure of overall satisfaction.

23. The method of claim 15, further comprising:
deriving a satisfaction rating from unstructured document metadata; and
analyzing an aggregation of metadata values to provide a measure of overall satisfaction.

24. The method of claim 8, further comprising:
presenting a trended report by displaying a measure trending over a time scale; and
wherein receiving an instruction to determine the one or more causal factors associated with the observation selected by the user further comprises:
allowing the user to select a specific data point on the time scale as the observation for investigating causal factors that drove the tracked measure to rise or fall when compared to the prior data point on the time scale.

25. The method of claim 8, further comprising:
presenting a non-trended report by displaying volume aggregated over a non-time data dimension; and
wherein receiving an instruction to determine the one or more causal factors associated with the observation selected by the user further comprises:
allowing the user to select a specific data dimension value as the observation for investigating any causal factors that show a statistically significant tendency to associate more with the selected data dimension value rather than other data dimension values.

26. The method of claim 18, further comprising:
presenting a non-trended report by displaying sentiment aggregated over a non-time data dimension; and
wherein receiving an instruction to determine the one or more causal factors associated with the observation selected by the user further comprises:
allowing the user to select a specific data dimension value as the observation for investigating causal factors that show at least one of a statistically significant tendency to associate more with positive sentiment rather than negative sentiment and a statistically significant tendency to associate more with negative sentiment rather than positive sentiment.

27. The method of claim 19, further comprising:
presenting a non-trended report by displaying sentiment aggregated over a non-time data dimension; and
wherein receiving an instruction to determine the one or more causal factors associated with the observation selected by the user further comprises:
allowing the user to select a specific data dimension value as the observation for investigating causal factors that show at least one of a statistically significant tendency to associate more with positive sentiment rather than negative sentiment and a statistically significant tendency to associate more with negative sentiment rather than positive sentiment.

28. The method of claim 20, further comprising:
presenting a non-trended report by displaying sentiment aggregated over a non-time data dimension; and
wherein receiving an instruction to determine the one or more causal factors associated with the observation selected by the user further comprises:
allowing the user to select a specific data dimension value as the observation for investigating causal factors that show at least one of a statistically significant tendency to associate more with positive sentiment rather than negative sentiment and a statistically significant tendency to associate more with negative sentiment rather than positive sentiment.

29. The method of claim 21, further comprising:
executing and presenting a non-trended report by displaying overall satisfaction aggregated over a non-time data dimension; and
wherein receiving an instruction to determine the one or more causal factors associated with the observation selected by the user further comprises:
allowing the user to select a specific data dimension value as the observation for investigating causal factors that show at least one of a statistically significant tendency to associate more with high degree satisfaction rather than a poor degree of satisfaction and a statistically significant tendency to associate more with a poor degree of satisfaction rather than high degree satisfaction.

30. The method of claim 22, further comprising:
presenting a non-trended report by displaying overall satisfaction aggregated over a non-time data dimension; and
wherein receiving an instruction to determine the one or more causal factors associated with the observation selected by the user further comprises:
allowing the user to select a specific data dimension value as the observation for investigating causal factors that show at least one of a statistically significant tendency to associate more with high degree satisfaction rather than a poor degree of satisfaction and a statistically significant tendency to associate more with a poor degree of satisfaction rather than high degree satisfaction.

31. The method of claim 23, further comprising:
presenting a non-trended report by displaying overall satisfaction aggregated over a non-time data dimension; and
wherein receiving an instruction to determine the one or more causal factors associated with the observation selected by the user further comprises:
allowing the user to select a specific data dimension value as the observation for investigating causal factors that show at least one of a statistically significant tendency to associate more high degree satisfaction rather than a poor degree of satisfaction and a statistically significant tendency to associate more with a poor degree of satisfaction rather than high degree satisfaction.

32. The method of claim 8, wherein the one or more sources of the unstructured data comprise at least one of social media text, call center logs, survey comments, email, word processing documents, spreadsheets, presentation materials, PDF files, web pages, news reports, media reports, case files, transcriptions, file servers, web servers, enterprise content, enterprise search tool repositories, intranets, optical character recognition content, speech-to-text conversions, knowledge management systems, and document management systems.

33. A non-transitory computer readable storage medium comprising instructions that if executed enables a computing system to:
access unstructured data from one or more sources of text;
process text from the unstructured data to extract features from the unstructured data;
receive an instruction to execute a report from a user;
receive an instruction to determine the one or more causal factors associated with an observation selected by the user;
determine a baseline for comparison with the selected observation, the baseline being determined by the user as either data comprising one or more features in which the observation is not present or the data originating in a particular time period comprising one or more features in which the observation is present;
determine the one or more causal factors associated with the selected observation by calculating an impact of one or more of the features of the unstructured data on the observation selected by the user using the baseline for comparison with the observation selected, at least one of the one or more causal factors comprising one or more of the features, and the impact on a measurable characteristic of the observation selected being calculated based on a comparison of one or more of the features of the unstructured data associated with the presence of the observation and features of the unstructured data associated with the baseline, the measurable characteristic being a volume-based metric, a sentiment metric, a satisfaction metric, or another user-defined metric;
rank the one or more causal factors based on a measure of statistical association to the selected observation; and
present results to the user.

34. The non-transitory computer readable storage medium of claim 33, wherein the one or more causal features comprise at least one of a lexical feature, a grammatical feature, and a semantic feature.

35. The non-transitory computer readable storage medium of claim 33, further comprising instructions that if executed enable the computing system to:
aggregate the extracted features to determine a measure of volume.

36. The non-transitory computer readable storage medium of claim 33, further comprising instructions that if executed enable the computing system to:
associate the observation selected by the user with an unstructured text document of the unstructured data, wherein the features extracted from the unstructured data comprise features extracted from the unstructured text document; and select the features extracted from the unstructured text document associated with the observation selected by the user as candidate causal factors.

37. The non-transitory computer readable storage medium of claim 33, further comprising instructions that if executed enable the computing system to:
categorize the unstructured data into category topics.

38. The non-transitory computer readable storage medium of claim 37, further comprising instructions that if executed enable the computing system to:
aggregate category topics to provide a measure of volume.

39. The non-transitory computer readable storage medium of claim 36, further comprising instructions that if executed enable the computing system to:
select category topics from unstructured text documents associated with the observation as candidate causal factors.

40. The non-transitory computer readable storage medium of claim 33, further comprising instructions that if executed enable the computing system to:
extract metadata from unstructured text documents.

41. The non-transitory computer readable storage medium of claim 40, further comprising instructions that if executed enable the computing system to:
aggregate metadata values to provide a measure of volume.

42. The non-transitory computer readable storage medium of claim 40, further comprising instructions that if executed enable the computing system to:
select metadata values from unstructured text document metadata associated with the observation as candidate causal factors.

43. The non-transitory computer readable storage medium of claim 33, further comprising instructions that if executed enable the computing system to:
compute sentiment on unstructured text data; and
analyze an aggregation of extracted features to provide a measure of sentiment.

44. The non-transitory computer readable storage medium of claim 37, further comprising instructions that if executed enable the computing system to:
compute a sentiment on the unstructured text data; and
analyze an aggregation of category topics to provide a measure of sentiment.

45. The non-transitory computer readable storage medium of claim 40, further comprising instructions that if executed enable the computing system to:
compute a sentiment on the unstructured text data; and
analyze an aggregation of metadata values to provide a measure of sentiment.

46. The non-transitory computer readable storage medium of claim 33, further comprising instructions that if executed enable the computing system to:
derive a satisfaction rating from unstructured document metadata; and
analyze an aggregation of extracted features to provide a measure of overall satisfaction.

47. The non-transitory computer readable storage medium of claim 37, further comprising instructions that if executed enable the computing system to:
derive a satisfaction rating from unstructured document metadata; and
analyze an aggregation of category topics to provide a measure of overall satisfaction.

48. The non-transitory computer readable storage medium of claim 40, further comprising instructions that if executed enable the computing system to:
derive a satisfaction rating from unstructured document metadata; and
analyze an aggregation of metadata values to provide a measure of overall satisfaction.

49. The non-transitory computer readable storage medium of claim 33, further comprising instructions that if executed enable the computing system to:
present a trended report by displaying a measure trending over a time scale; and
wherein the instructions for receiving an instruction to determine the one or more causal factors associated with the observation selected by the user further comprise instructions that if executed enable the computing system to:
allow the user to select a specific data point on the time scale as the observation for investigating causal factors that drove the tracked measure to rise or fall when compared to the prior data point on the time scale.

50. The non-transitory computer readable storage medium of claim 33, further comprising instructions that if executed enable the computing system to:
present a non-trended report by displaying volume aggregated over a non-time data dimension; and
wherein the instructions for receiving an instruction to determine the one or more causal factors associated with the observation selected by the user further comprise instructions that if executed enable the computing system to:
allow the user to select a specific data dimension value as the observation for investigating any causal factors that show a statistically significant tendency to associate more with the selected data dimension value rather than other data dimension values.

51. The non-transitory computer readable storage medium of claim 43, further comprising instructions that if executed enable the computing system to:
present a non-trended report by displaying sentiment aggregated over a non-time data dimension; and
wherein the instructions for receiving an instruction to determine the one or more causal factors associated with the observation selected by the user further comprise instructions that if executed enable the computing system to:
allow the user to select a specific data dimension value as the observation for investigating causal factors that show at least one of a statistically significant tendency to associate more with positive sentiment rather than negative sentiment and a statistically significant tendency to associate more with negative sentiment rather than positive sentiment.

52. The non-transitory computer readable storage medium of claim 44, further comprising instructions that if executed enable the computing system to:
present a non-trended report by displaying sentiment aggregated over a non-time data dimension; and
wherein the instructions for receiving an instruction to determine the one or more causal factors associated with the observation selected by the user further comprise instructions that if executed enable the computing system to:
allow the user to select a specific data dimension value as the observation for investigating causal factors that show at least one of a statistically significant tendency to associate more with positive sentiment rather than negative sentiment and a statistically significant tendency to associate more with negative sentiment rather than positive sentiment.

53. The non-transitory computer readable storage medium of claim 45, further comprising instructions that if executed enable the computing system to:
present a non-trended report by displaying sentiment aggregated over a non-time data dimension; and
wherein the instructions for receiving an instruction to determine the one or more causal factors associated with the observation selected by the user further comprise instructions that if executed enable the computing system to:
allow the user to select a specific data dimension value as the observation for investigating causal factors that show at least one of a statistically significant tendency to associate more with positive sentiment rather than negative sentiment and a statistically significant tendency to associate more with negative sentiment rather than positive sentiment.

54. The non-transitory computer readable storage medium of claim 46, further comprising instructions that if executed enable the computing system to:
execute and present a non-trended report by displaying overall satisfaction aggregated over a non-time data dimension; and
wherein the instructions for receiving an instruction to determine the one or more causal factors associated with the observation selected by the user further comprise instructions that if executed enable the computing system to:
allow the user to select a specific data dimension value as the observation for investigating causal factors that show at least one of a statistically significant tendency to associate more with high degree satisfaction rather than a poor degree of satisfaction and a statistically significant tendency to associate more with a poor degree of satisfaction rather than high degree satisfaction.

55. The non-transitory computer readable storage medium of claim 47, further comprising instructions that if executed enable the computing system to:
present a non-trended report by displaying overall satisfaction aggregated over a non-time data dimension; and
wherein the instructions for receiving an instruction to determine the one or more causal factors associated with the observation selected by the user further comprise instructions that if executed enable the computing system to:
allow the user to select a specific data dimension value as the observation for investigating causal factors that show at least one of a statistically significant tendency to associate more with high degree satisfaction rather than a poor degree of satisfaction and a statistically significant tendency to associate more with a poor degree of satisfaction rather than high degree satisfaction.

56. The non-transitory computer readable storage medium of claim 48, further comprising instructions that if executed enable the computing system to:
present a non-trended report by displaying overall satisfaction aggregated over a non-time data dimension; and
wherein the instructions for receiving an instruction to determine the one or more causal factors associated with the observation selected by the user further comprise instructions that if executed enable the computing system to:
allow the user to select a specific data dimension value as the observation for investigating causal factors that show at least one of a statistically significant tendency to associate more high degree satisfaction rather than a poor degree of satisfaction and a statistically significant tendency to associate more with a poor degree of satisfaction rather than high degree satisfaction.

57. The non-transitory computer readable storage medium of claim 33, wherein the one or more sources of the unstructured data comprise at least one of social media text, call center logs, survey comments, email, word processing documents, spreadsheets, presentation materials, PDF files, web pages, news reports, media reports, case files, transcriptions, file servers, web servers, enterprise content, enterprise search tool repositories, intranets, optical character recognition content, speech-to-text conversions, knowledge management systems, and document management systems.

58. The system of claim 1, wherein the features extracted from the unstructured data comprise document features, word features, linguistic relationships, and sentence categories.

59. The system of claim 1, wherein the observation is a quantifiably measurable variation in the features extracted from the unstructured data.

* * * * *